US006415341B1

(12) United States Patent
Fry, Sr. et al.

(10) Patent No.: US 6,415,341 B1

(45) Date of Patent: Jul. 2, 2002

(54) POINT-OF-SALE TERMINAL ADAPTER

(75) Inventors: Thomas D. Fry, Sr., Gray Court, SC (US); Kyle H. Harris, Jr., Black Mountain; Edward C. Prather, Hendersonville, both of NC (US); Raymond P. Pruban, Jr., White Bear Lake, MN (US)

(73) Assignee: Tekserve POS, LLC, Eagan, MN (US)

(*) Notice: Subject to any disclaimer, the term of this patent is extended or adjusted under 35 U.S.C. 154(b) by 0 days.

(21) Appl. No.: 09/240,448

(22) Filed: Jan. 29, 1999

(51) Int. Cl.[7] ................................................ G06F 13/12

(52) U.S. Cl. ............................................ 710/62; 710/63

(58) Field of Search ................................ 710/62, 63, 64

(56) References Cited

U.S. PATENT DOCUMENTS

| | | | | |
|---|---|---|---|---|
| 4,723,212 A | 2/1988 | Mindrum et al. | ........... | 364/401 |
| 4,910,672 A | 3/1990 | Off et al. | .................... | 364/405 |
| 5,111,196 A | 5/1992 | Hunt | ..................... | 340/825.35 |
| 5,173,851 A | 12/1992 | Off et al. | .................... | 364/401 |
| 5,256,863 A | 10/1993 | Ferguson et al. | ........... | 235/383 |
| 5,380,991 A | 1/1995 | Valencia et al. | ............ | 235/383 |
| 5,420,606 A | 5/1995 | Begum et al. | .............. | 345/156 |
| 5,557,721 A | 9/1996 | Fite et al. | ................... | 395/148 |
| 5,612,868 A | 3/1997 | Off et al. | .................... | 364/214 |
| 5,727,153 A | 3/1998 | Powell | ....................... | 395/214 |
| 5,806,044 A | 9/1998 | Powell | ........................ | 705/14 |
| 5,832,457 A | 11/1998 | O'Brien et al. | ............... | 705/14 |
| 5,845,259 A | 12/1998 | West et al. | ................... | 705/14 |
| 5,884,278 A | 3/1999 | Powell | ........................ | 705/14 |
| 5,887,271 A | 3/1999 | Powell | ........................ | 705/14 |

OTHER PUBLICATIONS

"Attachment of Non–IBM I/O Devices to the 4683 Terminal", Jul. 10, 1987.

*Primary Examiner*—Douglas Hess
*Assistant Examiner*—Elaine Gort
(74) *Attorney, Agent, or Firm*—Kinney & Lange, P.A.

(57) ABSTRACT

A device and method for adapting a computer terminal for connection to at least one external device communicatively couples an adapter to the computer terminal and to the at least one external device. The computer terminal is configured to transmit data and commands to the adapter in a manner prescribed by the computer terminal for communication with external devices. The adapter is configured to detect computer terminal signals and transform selected patterns of the computer terminal signals into instructions and information having a predetermined format for operating the at least one external device. The data and commands transmitted from the computer terminal are interpreted and transformed into instructions and information in a predetermined format for operating the at least one external device. Signals are transmitted from the adapter to the computer terminal according to the manner of communication prescribed by the computer terminal, and the instructions and information for operating the at least one external device are transmitted to the at least one external device.

22 Claims, 12 Drawing Sheets

POINT-OF-SALE TERMINAL ADAPTER

BACKGROUND OF THE INVENTION

The present invention relates to a system for expanding the compatibility of a point-of-sale computer terminal. More particularly, the present invention relates to a device and method of coupling to data in a point-of-sale computer terminal and interpreting and converting that data for use by devices external to the terminal, including devices with which the terminal was not designed to operate.

Point-of-sale (POS) systems have become extremely common for transacting business between commercial retailers and consumers. Essentially, a POS system comprises one or more controllers connected to a plurality of POS computer terminals, such as cash register terminals. The cash register terminals are in turn connected to one or more peripheral devices that operate with the terminals. For example, a controller may be connected to three cash register terminals, and each cash register terminal may be connected to a printer and a bar code reader. Therefore, in operation, a consumer may present a number of items to be purchased to a store clerk. The clerk operates the bar code reader to scan in identification information on each item, with the information being passed to the cash register terminal and on to the controller. The controller determines the proper product name and price that corresponds to the identification information, and provides that information back to the cash register terminal. The cash register terminal may then add the determined price to the running total for the transaction and operate the printer to print the appropriate product name and price on a receipt. The controller keeps an overall log of all products sold at each cash register terminal connected to the controller, and the data in the overall log may be batched to a larger host computer system, for example, at regular intervals to analyze the sales characteristics of the particular retail location, the need for a re-order of inventory, etc.

The above-described POS system assumes that the controller, cash register terminal, and peripheral devices have all been designed to be compatible with one another. This assumption is not really tenable, since changes in the POS terminal market have caused some modifications to be made to the essential structure of POS systems, and proprietary controllers and cash register terminals are now manufactured by more than just a few major companies. New cash register terminals and controllers have been introduced that have significant differences from earlier terminals, and many peripherals are proprietary and therefore not designed to operate with older terminals or with terminals manufactured by competing companies. In addition, some applications of POS systems require memory or other capabilities that cannot be provided in the older terminals or the competing terminals. To simply purchase a completely new POS system, with a variety of new components, is an extremely expensive undertaking that requires a retailer to effectively scrap the prior system, which is undesirable because of the sizable investment that the retailer has already made in that system. However, this is currently the only upgrade option available to the retailer, since there is presently no means for making older or competing POS terminals and controllers entirely compatible with other POS components and features.

There have been attempts to provide limited compatibility between POS terminals and controllers and specific peripheral devices. One example of such an attempt is described in U.S. Pat. No. 5,712,629 to Curtiss, Jr. et al. The Curtiss, Jr. patent discloses an interface device that is connected between a POS terminal and a controller, for the purpose of monitoring data communicated between the terminal and the controller and transmitting data between the terminal, the controller and a peripheral unit. For example, the interface device may monitor the data transmitted from the terminal to the controller to detect a data sequence indicating that the "TOTAL" key has been pressed on the terminal. The interface device then may initiate a communication sequence between the controller and another peripheral device so that all of the product information sent from the terminal to the controller in the current transaction may be provided to the peripheral device for printing, electronic fund transfer, or whatever other purpose for which the peripheral device is provided. While this arrangement does allow a peripheral device not specifically designed for use with the other POS system components to be utilized, it provides only a single particular peripheral for use with the system, and it requires interruption of the flow of data between the POS terminal and the controller when the peripheral device is to be used.

There is a need in the art for a versatile, robust interfacing device that is operable to provide seamless compatibility between POS components and other devices, regardless of whether the other devices were designed to be compatible with the POS components.

BRIEF SUMMERY OF THE INVENTION

The present invention is, according to one aspect, a method of adapting a computer terminal for connection to at least one peripheral device. The computer terminal is capable of communicating signals with external devices in a prescribed manner, which must be emulated to the computer terminal to ensure proper operation. An adapter is communicatively coupled to the computer terminal and to the at least one peripheral device. The computer terminal is configured to transmit data and commands to the adapter in the manner prescribed for communication with external devices. The adapter is configured to detect computer terminal signals and transform selected patterns of the computer terminal signals into instruction and information having a predetermined format for operating the at least one peripheral device. The data and commands transmitted from the computer terminal are interpreted by the adapter and transformed into instructions and information in a predetermined format for operating the at least one peripheral device. Signals are transmitted from the adapter to the computer terminal according to the manner of communication prescribed by the computer terminal, to emulate operation of an external device recognized by the computer terminal. The instructions and information are transmitted to the peripheral device to control its operation based on the data and commands and computer terminal signals from the computer terminal.

According to another aspect, the present invention is an adapter for connection to a computer terminal in a point-of-sale computer system. The computer terminal is capable of communicating signals with external device in a prescribed manner. The adapter includes a first transceiver for communicatively coupling to the computer terminal, which is operable to receive data and commands from the computer terminal, transmit signals to the computer terminal according to the manner of communication prescribed by the computer terminal, and detect computer terminal signals. A second transceiver in the adapter communicatively couples to at least one external device, and is operable to transmit instructions and information to the at least one external device and receive external signals from the at least one external device. Emulation means interprets the data and commands received from the computer terminal, transforms the data and commands into instructions and information in a predetermined format for operating the at least one external device, and generates signals for transmission to the computer terminal according to the manner of communication prescribed by the computer terminal. Detection means detects computer signals and transforms selected patterns of the computer terminal signals into instructions and information in a predetermined format for operating the at least one external device. Control means selectively operates the first and second transceivers and routes signals between the first and second transceivers and the emulation means and detection means.

DETAILED DESCRIPTION

Figure 1:
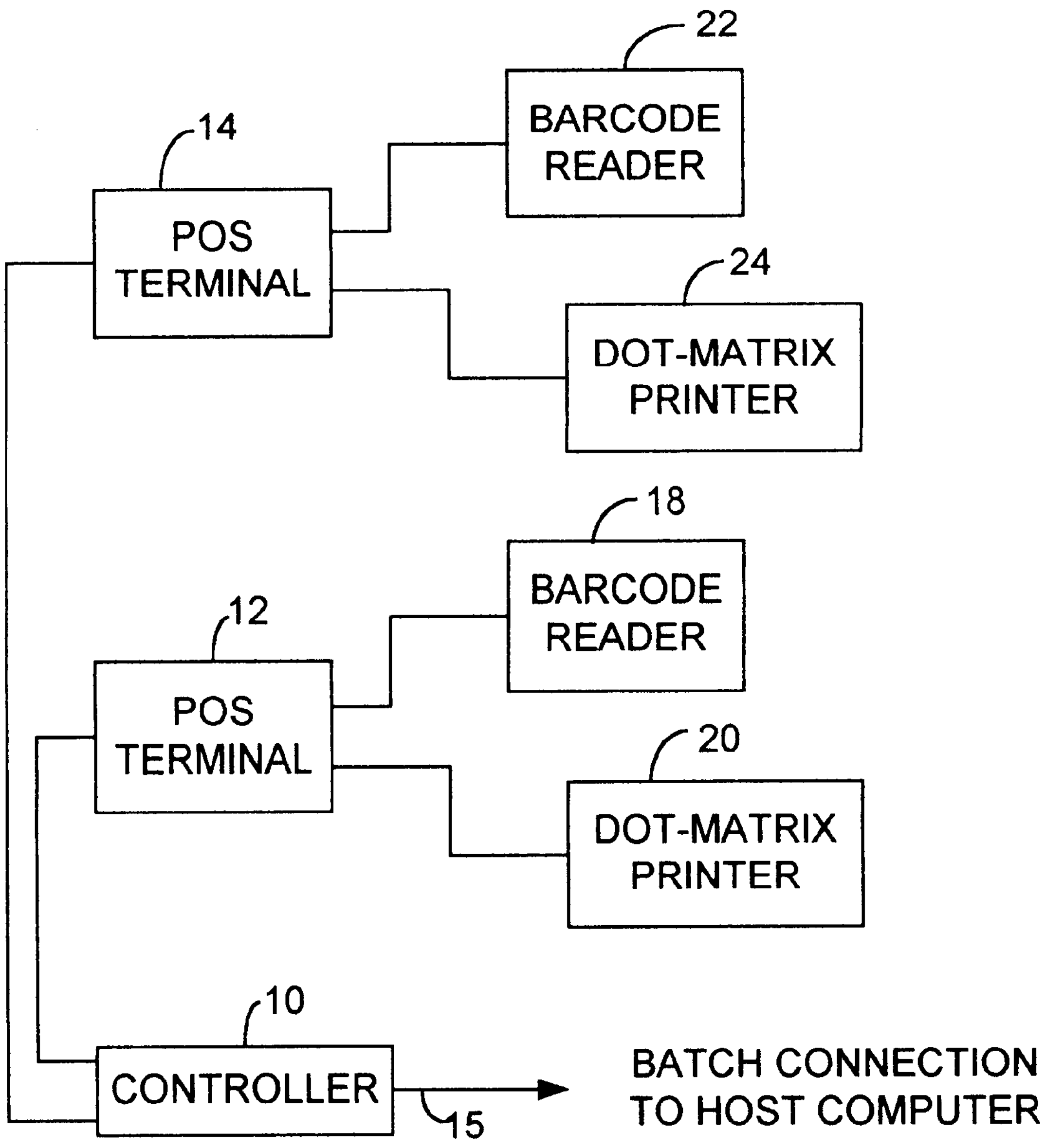
FIG. 1 PRIOR ART
FIG. 1 is a block diagram of a prior art point-of-sale (POS) system.

FIG. 1 is a block diagram of a prior art POS system. The core components of the system are controller 10 and POS terminals 12 and 14. In an exemplary embodiment, POS terminals 12 and 14 are IBM 46xx terminals, which are effectively the industry standard cash register terminals manufactured in the 1980's and 1990's. Similarly, controller 10 is an IBM 46xx controller compatible with POS terminals 12 and 14, and further includes a batch output 15 for periodically connecting and communicating with a host computer (not shown). Alternatively, the POS components shown in FIG. 1 may be devices manufactured by other companies, such as NCR, Fujitsu, or others.

POS terminals 12 and 14 are compatible with peripheral devices via a RS-485 serial input/output (I/O) channel. Peripheral devices such as barcode readers 18 and 22 and printers 20 and 24 (such as dot-matrix printers, for example) are connectable to POS terminals 12 and 14 via the RS-485 channel. POS terminals 12 and 14 are pre-programmed by the manufacturer to communicate data with barcode readers 18 and 22 and printers 20 and 24 according to a predetermined protocol. Therefore, in order for communication between barcode reader 18 and POS terminal 12 to be possible, for example, barcode reader 18 must be designed to communicate in the particular format supported by POS terminal 12. The same is true for printer 20, barcode reader 22, printer 24 and any other peripherals to be connected to POS terminals 12, or 14. As a result, the number and different types of peripherals available for use by POS terminals 12 and 14 are limited. POS terminals having communications channels other than the RS-485 channel have also been introduced; these POS terminals are still only operable with a limited number of peripheral devices designed to communicate with the particular terminal.

Figure 2:
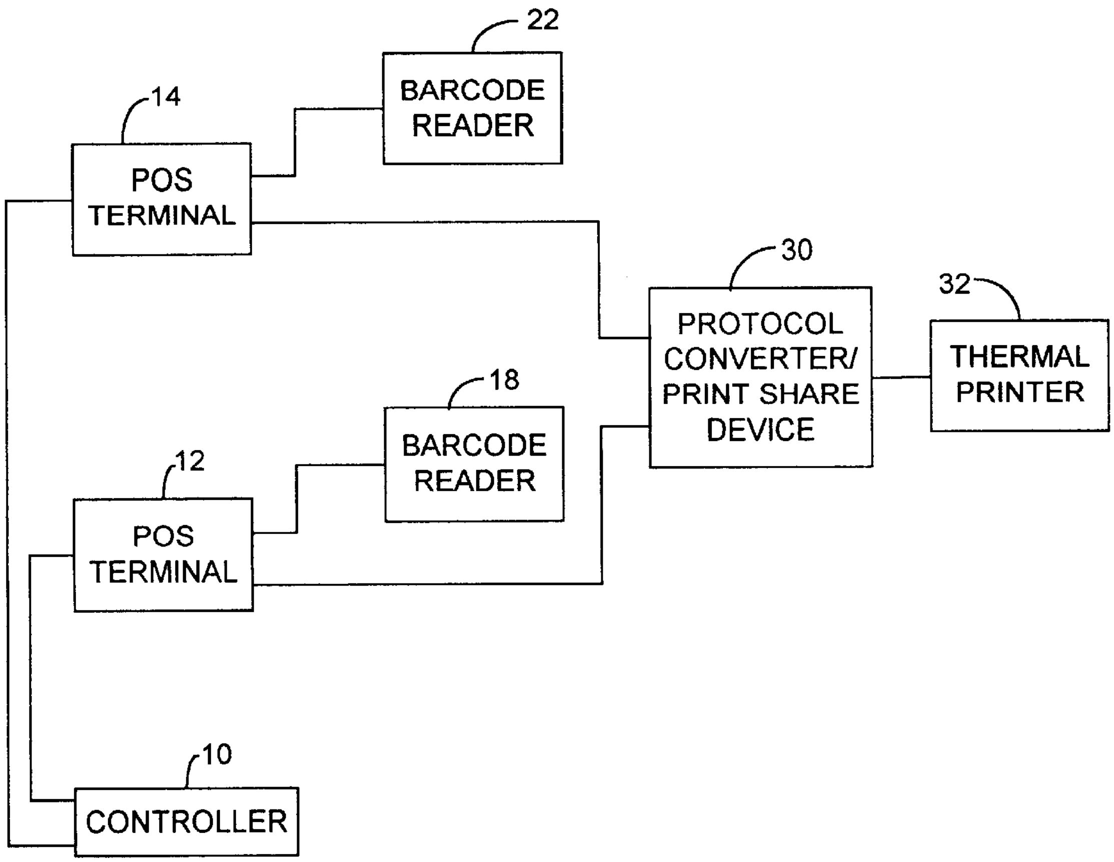
FIG. 2 is a block diagram of a POS system utilizing a protocol converter/print share device to interface peripherals according to the present invention.

FIG. 2 is a block diagram of a POS system utilizing a protocol converter/print share device 30 to interface peripherals according to the present invention. POS controller 10 and POS terminals 12 and 14 are essentially identical to those shown in FIG. 1. Barcode readers 18 and 22 may be connected to POS terminals 12 and 14 in the same manner shown in FIG. 1 as well. Protocol converter/print share device 30 is connected to both POS terminals 12 and 14 at their RS-485 I/O channels. In the particular embodiment shown in FIG. 2, the purpose of protocol converter/print share device 30 is to allow both POS terminals 12 and 14 access to printer 32 (which may be a thermal printer, for example). Therefore, protocol converter/print share device 30 is operable to convert the print commands output from POS terminals 12 and 14 to RS-232 format, prioritize those commands, and send those commands to printer 32 over the RS-232 communications link in standard ASCII format or another format understood by printer 32. Protocol converter/print share device 30 also transmits data back to POS terminals 12 and 14 on the RS-485 I/O channel to the extent needed to fully emulate the operation of a printer with which POS terminals 12 and 14 were designed to be compatible. As a result, POS terminals 12 and 14 are both compatibly connected to printer 32.

In addition to providing a mechanism to enable POS terminals 12 and 14 to share a printer via emulation, protocol converter/print share device 30 also enables the enhanced functions of printer 32 to be utilized, despite the fact that those features are not directly supported by POS terminals 12 and 14. This may be accomplished by utilizing the feature card capabilities of POS terminals 12 and 14. POS terminals 12 and 14, being IBM 46xx cash register terminals in an exemplary embodiment, are provided with a number of feature card ports, at least one of which is referred to as a "feature C" port. The feature C capability of POS terminals 12 and 14 allows raw data to be transmitted from a communications port, with no interpretation or understanding of the raw data by POS terminals 12 and 14 required. Therefore, it is possible for headers, commands, data, and other signals to be sent as raw data by using the feature C capability. POS terminals 12 and 14 may be programmed in a register-specific programming language (referred to as user-exit programming in IBM 46xx POS terminals, for example) to transmit headers, commands and data from the feature card port as raw data. This programming allows the terminal to send data and commands that utilize selected features of a peripheral device that are not inherently supported by the native programming of the cash register terminal. In order to use the feature C capability, protocol converter/print share device 30 operates to emulate a feature C device; that is, protocol converter/print share device 30 used the same device address as the feature C card port address, understands and acts on commands sent to it by the POS terminal operating system that are in feature C format, and responds to the POS terminal operating system with correctly formatted status and data just as if the feature card was utilized. The particular requirements for attaching to an IBM 46xx terminal and operating properly are set forth in the IBM document entitled “Attachment of Non-IBM I/O Devices to the 4683 Terminal,” dated Jul. 10, 1987, which is hereby incorporated by reference.

Figure 3:
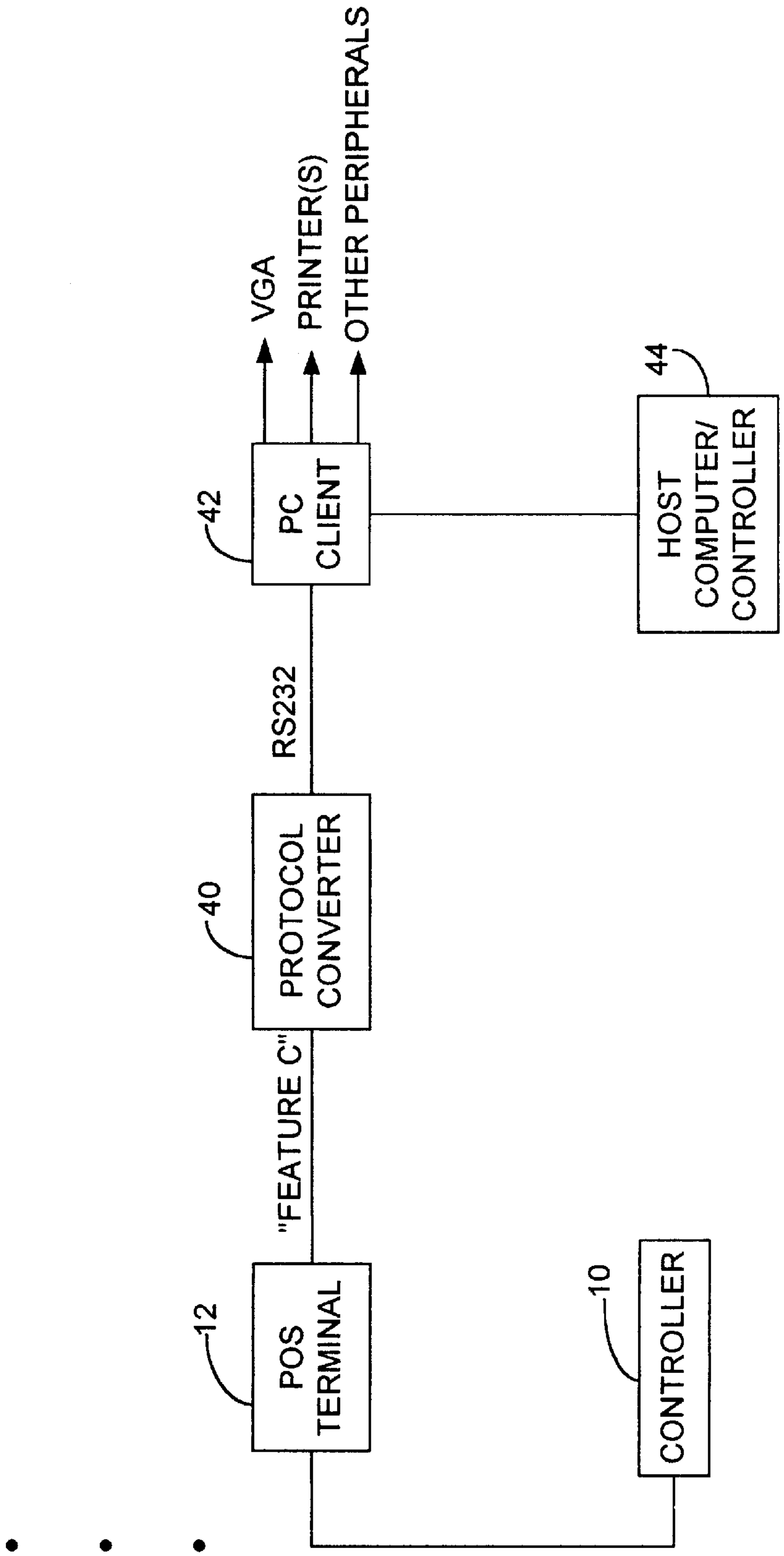
FIG. 3 is a block diagram of a POS system utilizing a protocol converter to interface a PC client and a number of peripherals according to the present invention.

FIG. 3 is a block diagram of a POS system utilizing a protocol converter 40 to interface a PC client 42 and a number of peripherals according to a further aspect of the present invention. POS terminal 12 is connected to controller 10 in the same manner described above with respect to FIGS. 2 and 3. In an exemplary embodiment, protocol converter 40 is connected to POS terminal 12 at its RS-485 I/O channel; other communications channels may be utilized in alternative embodiments. PC client 42 may be any commercially available computer known in the art, and may be connected to protocol converter 40 by any of a number of communications protocols known in the art.

In the embodiment shown in FIG. 3, the purpose of protocol converter 40 is to allow POS terminal 12 to communicate data and commands to PC client 42, which in turn operates one or more peripherals and communicates with host computer/controller 44. Therefore, protocol converter 40 is operable to convert commands output from POS terminal 12 to a communications format such as RS-232, ethernet, or another communication format or protocol known in the art. Protocol converter 40 is further operable to re-format these commands to control peripherals attached to PC client 42, and to transmit appropriate data in real-time through PC client 42 to host computer/controller 44. In another embodiment, protocol converter 40 may be provided with a plurality of ports for direct connection to the peripherals, with each port utilizing any of a number of communication links and formats, rather than connecting to the peripherals through PC client 42. Protocol converter 40 also transmits data back to POS terminal 12 on the RS-485 I/O channel to the extent needed to fully emulate the operation of a peripheral with which POS terminal 12 was designed to be compatible. Protocol converter 40 enables a number of functions achievable by the capabilities of PC client 42 and/or several peripheral devices to be utilized, despite the fact that those functions are not directly supported by POS terminal 12. As described above with respect to FIG. 2, this may be accomplished by utilizing the feature card capabilities of POS terminal 12. Protocol converter 40 is operable to emulate a feature C device, and POS terminal 12 may programmed to transmit commands and data as raw data in feature C format. Again, the particular requirements for attaching to the 46xx terminal and operating properly are set forth in the IBM document entitled “Attachment of Non-IBM I/O Devices to the 4683 Terminal,” dated Jul. 10, 1987, which has been incorporated by reference herein. PC client 42 may also include a programmed or programmable controller for interpreting data and commands received from POS terminal 12 through protocol converter 40, to operate peripherals and manipulate data for communication with host computer/controller 44.

Figure 4:
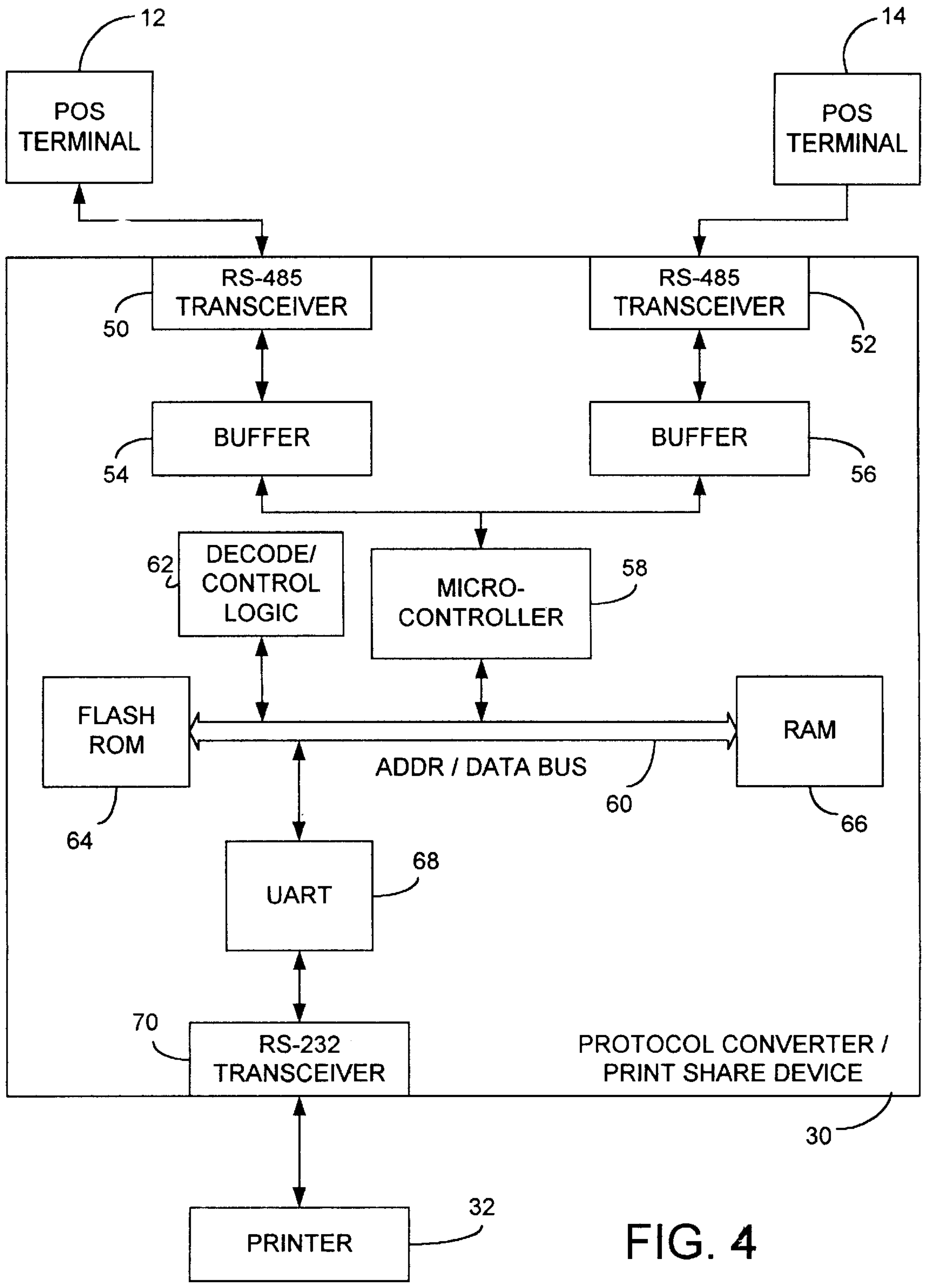
FIG. 4 is a block diagram of the hardware components of the protocol converter/print share device shown in FIG. 2.

FIG. 4 is a block diagram of exemplary hardware components of protocol converter/print share device 30 shown in FIG. 2. POS terminals 12 and 14 are communicatively coupled to protocol converter/print share device 30 by RS-485 transceivers 50 and 52. RS-485 transceiver 50 is in turn connected to buffer 54, and RS-485 transceiver 52 is connected to buffer 56. Buffers 54 and 56 are coupled to microcontroller 58, which in turn is coupled to ADDR/DATA bus 60. Buffers 54 and 56 serve to electrically isolate input signals from the circuit board contained in protocol converter/print share device 30. ADDR/DATA bus 60 supports communication between microcontroller 58, decode/control logic 62, flash ROM 64, RAM 66 and UART 68. In an exemplary embodiment, microcontroller 58 is a 80C51XA chip manufactured by Philips Semiconductors. UART 68 is coupled to RS-232 transceiver 70, which communicatively couples protocol converter/print share device 30 to printer 32. Protocol converter/print share device 30 may be programmed to provide adaptability through selected emulations, features and protocols by programming the contents of flash ROM 64 to recognize and transmit particular signals and sequences. The functions performed by the various components of protocol converter/print share device 30 are described in greater detail below with respect to FIG. 6.

Figure 5:
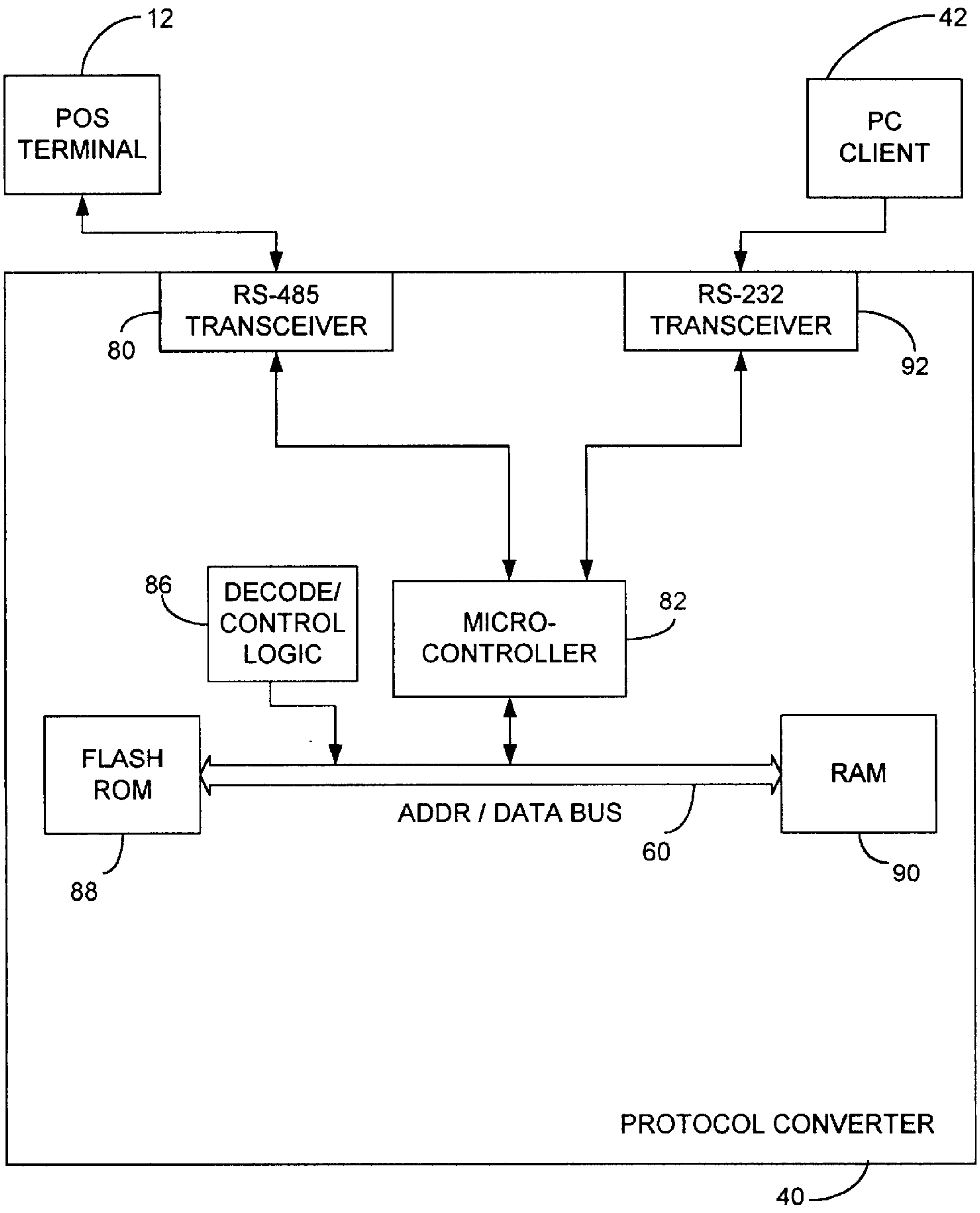
FIG. 5 is a block diagram of the hardware components of the protocol converter shown in FIG. 3.

FIG. 5 is a block diagram of the hardware components of protocol converter 40 shown in FIG. 3. POS terminal 12 is communicatively coupled to protocol converter 40 by RS-485 transceiver 80. RS-485 transceiver 80 is coupled to microcontroller 82, which is turn is coupled to ADDR/DATA bus 84. In an exemplary embodiment, microcontroller 82 is a 80C51XA chip manufactured by Philips Semiconductors. ADDR/DATA bus 84 supports communication between microcontroller 82, decode/control logic 86, flash ROM 88 and RAM 90. Microcontroller 82 is also connected to RS-232 transceiver 92, which communicatively couples protocol converter 40 to PC client 42 or another RS-232 device. Protocol converter 40 may be programmed to provide adaptability through selected emulations, features and protocols by programming the contents of flash ROM 64 to recognize and transmit particular signals and sequences. The functions performed by the various components of protocol converter 40 are described in greater detail below with respect to FIG. 7.

Figure 6:
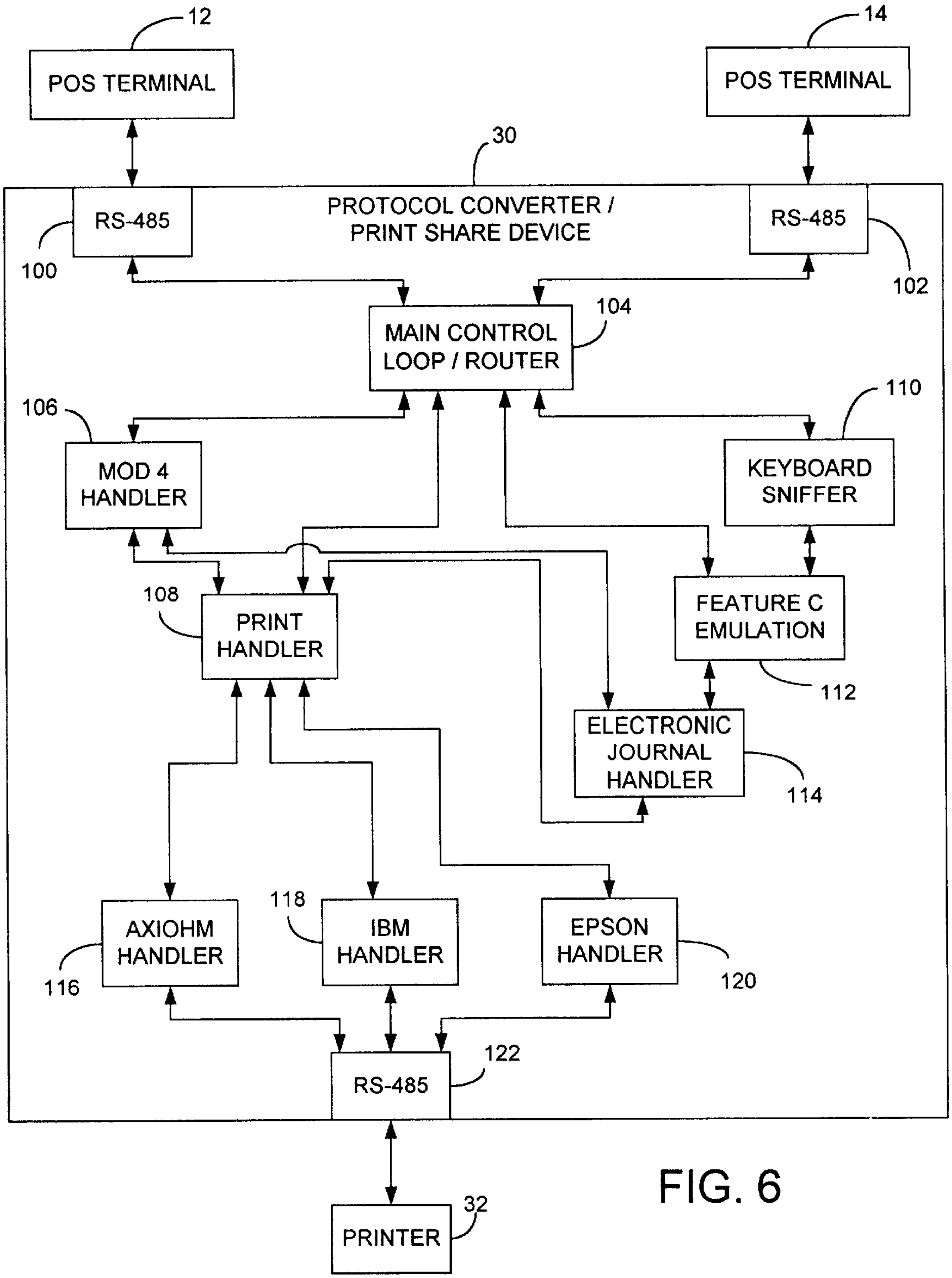
FIG. 6 is a functional block diagram of a protocol converter/print share device according to the present invention.

FIG. 6 is a functional block diagram of protocol converter/print share device 30 shown in FIGS. 2 and 4. POS terminals 12 and 14 communicate with protocol converter/print share device 30 via RS-485 communication links 100 and 102. The information and commands communicated from POS terminals 12 and 14 are sent to main control loop/router 104. Main control loop/router 104 serves several administrative functions in protocol converter/print share device 30. One primary function of main control loop/router 104 is to open and configure the devices that are utilized through the interface provided by protocol converter/print share device 30, assigning proper device addresses so that POS terminals 12 and 14 recognize the devices in order to send them data and commands. Main control loop/router 104 also implements a routine to determine the type of device (such as printer type) connected to protocol converter/print share device 30, and to periodically update the status of the device according to the protocol of POS terminals 12 and 14. Main control loop/router 104 further serves to check the type of incoming data and commands and forward the data and commands to the appropriate handler.

There are several subroutines that communicate data and commands with main control loop/router 104, including MOD4 handler 106, print handler 108, keyboard sniffer 110 and feature C emulation block 112. MOD4 refers to a printer type that is supported by the IBM 46xx cash register terminals, and one option in implementing protocol converter/print share device 30 is to emulate a MOD4 printer to POS terminals 12 and 14. MOD4 handler 106 therefore passes MOD4 printer commands to print handler 108, and also sends MOD4 printer status messages and other signals to main control loop/router 104 for transmission to POS terminals 12 and 14 as required by the MOD4 printer communication protocol specified by the 46xx cash register terminals. For MOD4 emulation, no additional programming of POS terminals 12 and 14 is required, since they are inherently designed to support MOD4 printers. Another option in implementing protocol converter/print share device 30 is to emulate a feature C device to POS terminals 12 and 14. In that case, feature C emulation block 112 communicates with main control loop/router 104 to cause appropriate data and commands to be sent to print handler 108 and to cause appropriate feature C signals to be sent to POS terminals 12 and 14. Access to features not supported by POS terminal may be accessed by performing feature C emulation, with POS terminal 12 being programmed by the user to send appropriate data to trigger the enhanced peripheral features. Alternatively, protocol converter 40 may include programming to convert data signals transmitted from POS terminal 12 into appropriate commands for accessing the enhanced features of the peripheral.

Keyboard sniffer 110 is a subroutine that detects keyboard strokes on POS terminals 12 and 14 directly. In an exemplary embodiment, this detection is performed by monitoring the 485 input/output bus of POS terminals 12 and 14 for signals representing keystrokes. Other input/output signals in addition to keyboard strokes may also be detected in this manner from the 485 input/output bus. By implementing keyboard sniffer 110, certain keyboard sequences and signal patterns can be recognized and used to activate features and control configuration parameters of protocol converter/print share device 30 and or printer 32. This capability may be used either instead of or in conjunction with feature C emulation to provide additional features and capabilities to POS terminals 12 and 14.

Electronic journal handler 114 is a subroutine that provides for electronic storage and retrieval of data in an electronic journal upon receipt of an appropriate command, which may be received by MOD4 handler 106, keyboard sniffer 110 or feature C emulation block 112 and passed on to electronic journal handler 114 in the proper format. An actual MOD4 printer includes both a cash receipt tape to be provided to a customer and a journal receipt to keep a log of desired transaction data. Therefore, a command sent to MOD4 handler 106 to print journal data may be re-formatted and passed on to electronic journal handler 114 to electronically store the data in a flash memory. Alternatively, a series of keystrokes or a feature C command sent to feature C emulation block 112 may trigger the electronic storage of data by electronic journal handler 114. The data contained in the electronic journal may be printed upon receipt of an appropriate command by sending the data stored in the electronic journal to print handler 108, or may be accessed electronically through feature C emulation block 112 upon receipt of a feature C command or a series of keystrokes or other signals.

Print handler 108 controls the operation of the subroutines provided for each specific type of printer supported by protocol converter/print share device 30. In the exemplary embodiment shown in FIG. 6, Axiohm handler 116, IBM handler 118 and Epson handler 120 are provided to allow operation with printers made by each of those manufacturers. These subroutines operate RS-232 link 122 to communicate with printer 32, and along with print handler 108 provide the necessary printer type information to allow main control loop/router 104 to configure protocol converter/print share device 30 for proper operation with POS terminals 12 and 14. It will be understood by one skilled in the art that handlers for other printers and devices may also be provided for operation according to the present invention.

Figure 7:
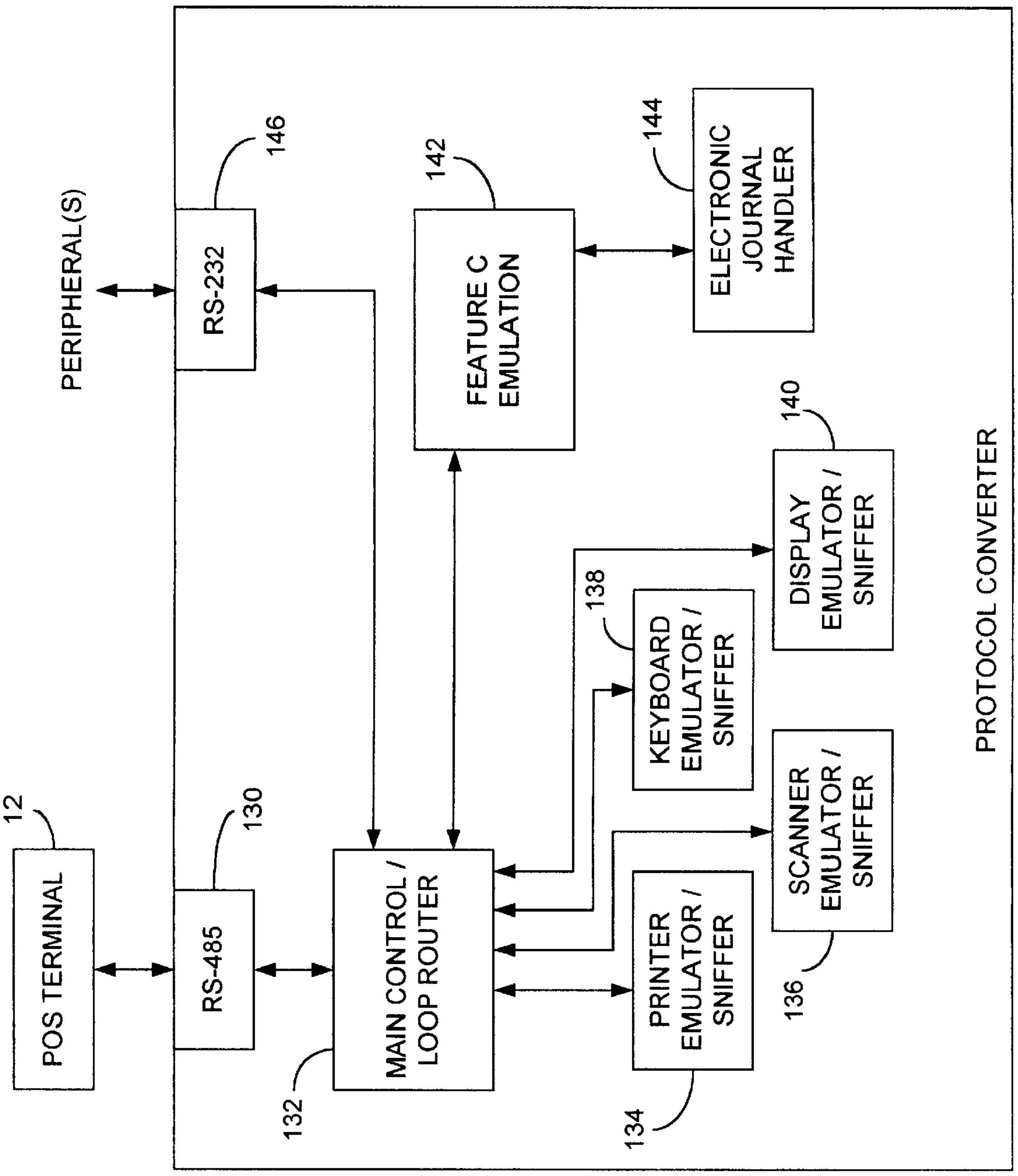
FIG. 7 is a functional block diagram of a protocol converter according to the present invention.

FIG. 7 is a functional block diagram of protocol converter 40 shown in FIGS. 3 and 5. POS terminal 12 communicates with protocol converter 40 via RS-485 communication link 130. The information and commands communicated from POS terminal 12 are sent to main control lop/router 132. Main control loop/router 132 serves several administrative functions in protocol converter 40. One primary function of main control loop/router 132 is to open and configure the devices that are utilized through the interface provided by protocol converter 40, assigning proper device addresses so that POS terminal 12 recognizes the devices in order to send them data and commands. Main control loop/router 132 also serves to check the type of incoming data and commands and forward the data and commands to the appropriate emulator or handler.

There are several subroutines that communicate data and commands with main control loop/router 132, including printer emulator/sniffer 134, scanner emulator/sniffer 136, keyboard emulator/sniffer 138, display emulator/sniffer 140 and feature C emulation block 142. One option for connecting to POS terminal 12 is to emulate a feature C device to the terminal. Feature C emulation block 142 therefore communicates with main control loop/router 132 to cause appropriate data and commands to be sent to the peripheral on RS-232 link 146 and to cause appropriate feature C signals to be sent to POS terminal 12 on RS-485 link 130. The information sent on RS-232 link may for example be in ASCII format, so that the data may be utilized and manipulated by any of a number of external devices. Electronic storage and retrieval of data in an electronic journal is also provided upon receipt of an appropriate command, which is received by feature C emulation block 142 and passed on to electronic journal handler 144 in the proper format. Access to features not supported by POS terminal may be accessed by performing feature C emulation, with POS terminal 12 being programmed by the user to send appropriate data to trigger the enhanced peripheral features. Alternatively, protocol converter 40 may include programming to convert data signals transmitted from POS terminal 12 into appropriate commands for accessing the enhanced features of the peripheral.

Printer emulator/sniffer 134 detects data and command sequences occurring on POS terminal 12 directly, and certain sequences can be recognized and used to activate features and control configuration parameters of protocol converter 40 and a printer connected to operate with protocol converter 40. Similarly, scanner emulator/sniffer 136, keyboard emulator/sniffer 138 and display emulator/sniffer 140 detect data and command sequences on POS terminal 12 directly, and certain sequences can be recognized and used to activate features and control configuration parameters of protocol converter 40 and a scanner, keyboard or display connected to operate with protocol converter 40. The emulated peripherals may be devices with which POS terminal 12 was designed to operate, in which case direct commands would be sent from POS terminal 12 to control the peripherals, and the commands would be interpreted and sent in the proper format (such as ASCII format, for example) to the peripherals on RS-232 link 146. Alternatively, the emulated peripherals may be devices with enhanced features not supported by POS terminal 12, in which case the commands to control the peripherals are derived from the data and command sequences that are detected ("sniffed") on POS terminal 12. This capability may be used either instead of or in conjunction with feature C emulation to provide additional features and capabilities to POS terminal 12. For example, peripherals such as printers, barcode scanners, displays, keyboards, memories, smart card readers, biometric devices such as fingerprint readers, signature capture devices, or other devices may be supported by the adapter of the present invention.

For purposes of illustration, one example of a peripheral that may be coupled to POS terminal 12 by protocol converter 40 is a virtual display. Many POS terminals already have a built-in display or a receipt tape for showing the items purchased during a particular transaction. Therefore, the POS terminals are already designed to communicate this data to the particular supported device in a certain format. A virtual display may be maintained by emulating the supported device or devices, so that the POS terminal communicates the data as if the virtual display were in fact the supported device. The virtual display itself may be a VGA monitor or another type of display known in the art. Furthermore, the virtual display may be operated beyond the features and data that the POS terminal would communicate to a supported device. Particular keyboard sequences or signal patterns may be detected from the POS terminal that trigger the virtual display to perform a particular task. For example, upon detection a signal pattern indicating that a customer has just purchased a particular brand of product, the virtual display may be operated to display an advertisement for another product offered by the same company, or for a competing product offered by another company. A great variety of combinations of devices and features are possible. The adapter of the present invention provides the capability to access both supported features and non-supported features in external devices that were not originally designed to operate with the particular POS terminal in use.

The functional blocks and descriptions relating to FIGS. 6 and 7 represent the essence of the present invention, providing increased capability and compatibility to a POS terminal by sniffing signals and data and emulating devices and protocols. Other arrangements of functional modules that achieve the sniffing, emulating, and communicating as described herein are therefore within the scope of the present invention.

Figure 8A:
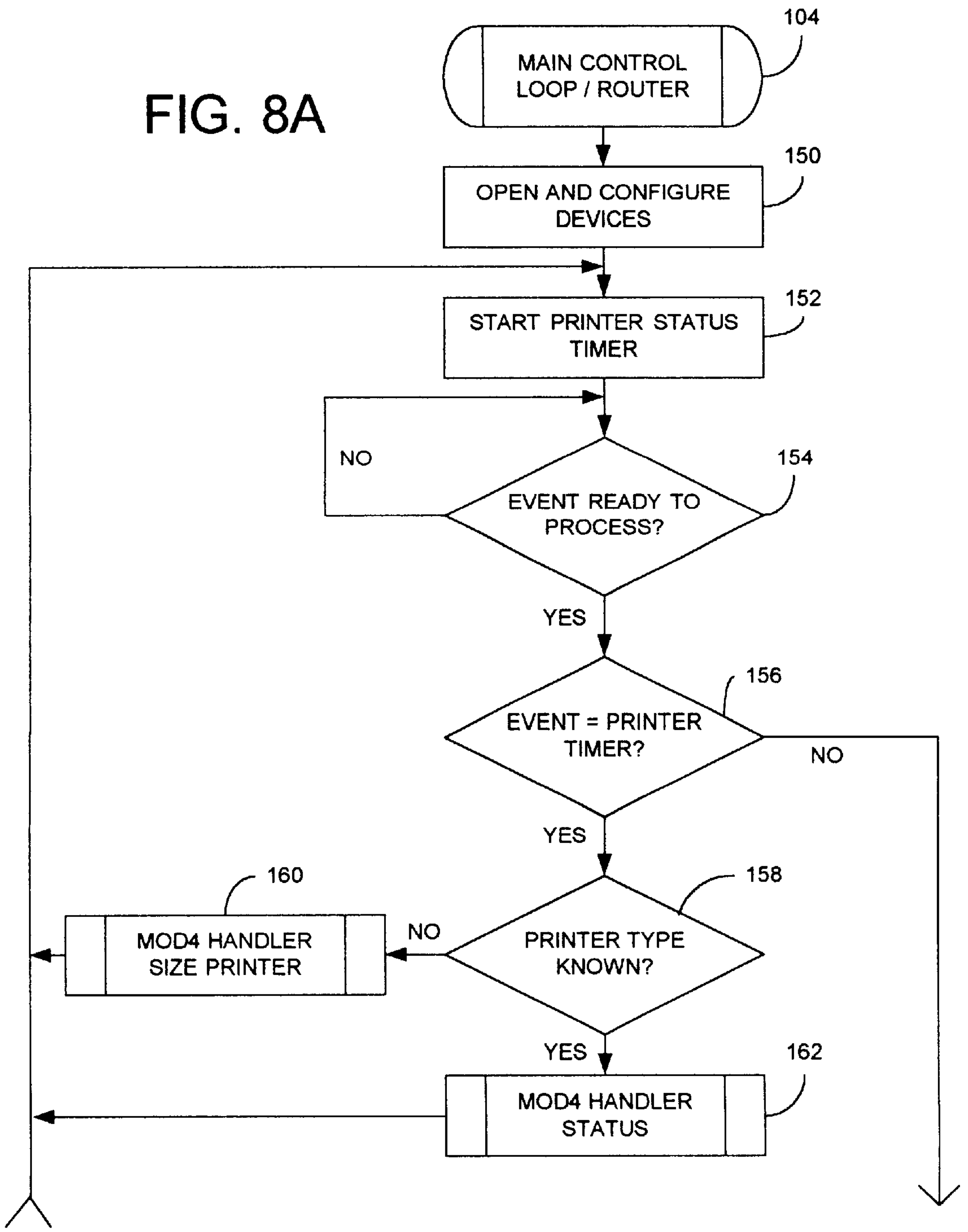
FIGS. 8A and 8B are flow diagrams illustrating the method and decision steps implemented by the main control loop of the protocol converter/print share device of the present invention.
Figure 8B:
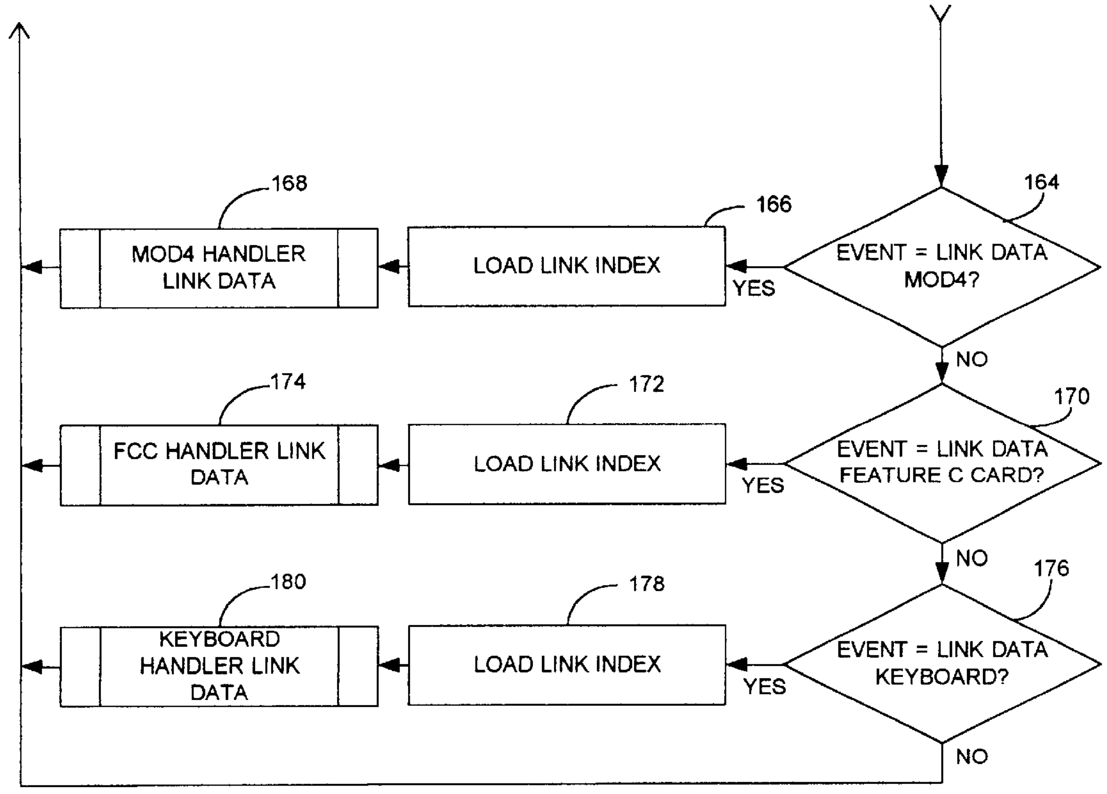

FIGS. 8A, 8B, 9A, 9B and 10 are flow diagrams provided to show examples of the method and decision steps performed by various software modules and subroutines of the present invention. FIGS. 8A and 8B show the method performed by main control loop/router 104 of protocol converter/print share device 30 shown in FIG. 6, for an embodiment involving only simple connections to a printer, for the sake of simplicity. Initially, devices are opened and configured at block 150. This involves assigning proper device addresses for the devices being emulated (such as MOD4 printers or other supported devices, for example), setting up the drivers in protocol converter/print share device 30, and other administrative functions. Next, the printer status timer is started at block 152, and an iterative check is performed to see if there is an event to process at decision block 154. One example of an event to process is a printer status timer signal, which is checked for at decision block 156. MOD4 printers are inherently set up to transmit an unsolicited status signal at regular time intervals (such as twice per second), so the printer status generates a signal at those regular intervals. If there is a printer timer signal to process, it is then determined at decision block 158 whether the actual printer type is known. If it is not known, the MOD4 handler executes a size printer function at block 160 to determine the printer type. This step is actually performed in conjunction with the print handler, which interrogates the printer connected to the protocol converter/print share device to obtain printer type information. If the printer type is known, the MOD4 handler transmits the printer status message at block 162 in the appropriate format to the attached POS terminal. Similar process steps may be programmed to be performed by the adapter for other devices supported by the POS terminal(s).

The other events that may occur for processing involve link data functions, which execute the actual data communications from the POS terminal through the adapter to the printer. One possible link data event may be in MOD4 format, which is checked for at decision block 164. If the link data event is for a MOD4 printer, a link index referring to the source and type of data is loaded at block 166 and the MOD4 handler executes a link data function at block 168. Another possible link data event may be in feature C format, which is checked for at decision block 170. If the link data event is for a feature C device, a link index referring to the source and type of data is loaded at block 172 and the feature C emulation handler executes a link data function at block 174. A further possible link data event may be in the form of a pattern of signals detected from the keyboard, for example, which is checked for at decision block 176. If the link data event is a command or data from a recognized keyboard sequence, a link index referring to the source and type of data is loaded at block 178 and the keyboard sniffer/handler (or the feature C emulation handler, in some cases) executes a link data function at block 180. Other link data events from signals occurring on the POS terminal(s) or on other devices may also be accommodated by the main control loop/router in a similar manner, as will be understood by one skilled in the art.

Figure 9A:
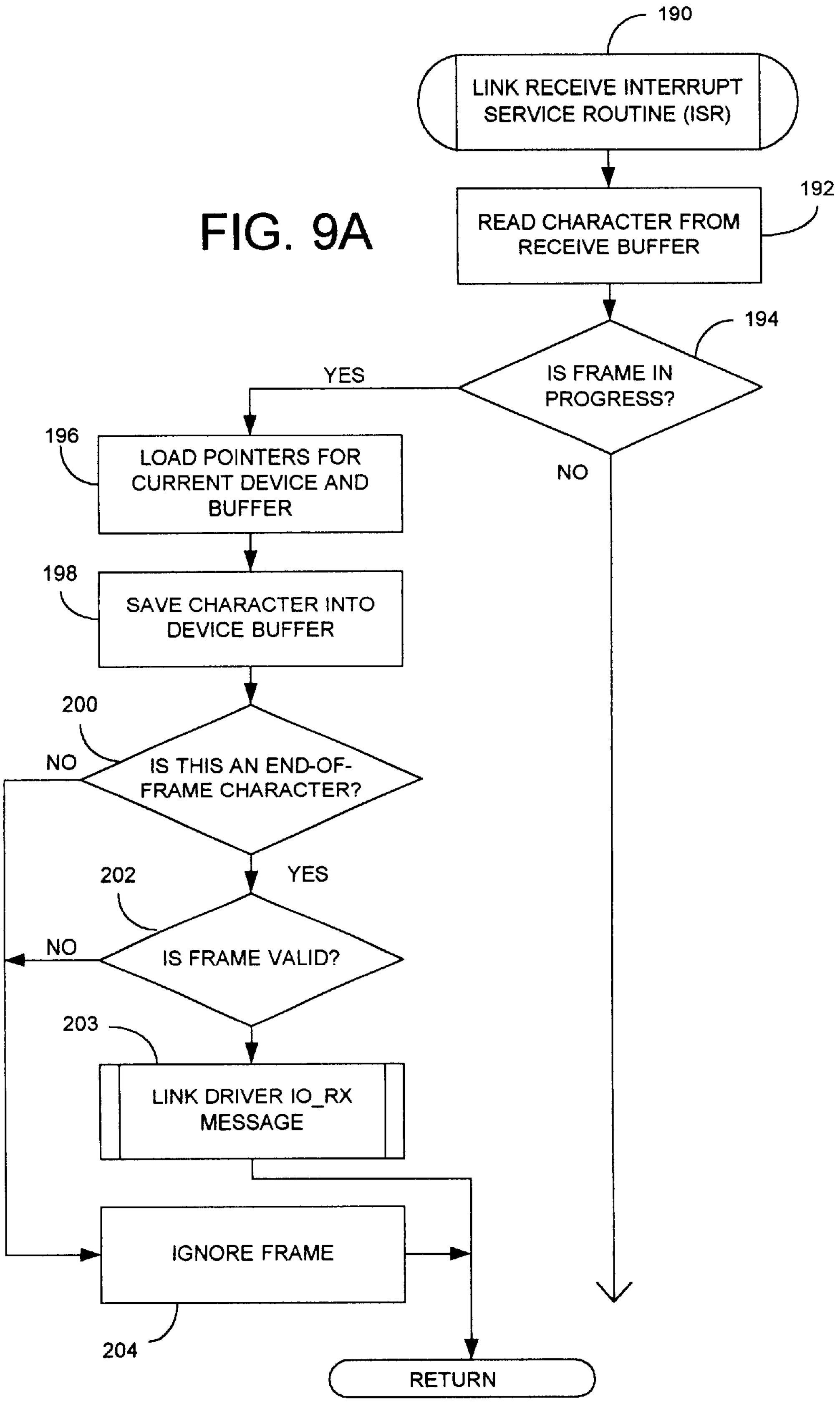
FIGS. 9A and 9B are flow diagrams illustrating the method and decision steps implemented by a link receive interrupt service routine of the protocol converter/print share device of the present invention.
Figure 9B:
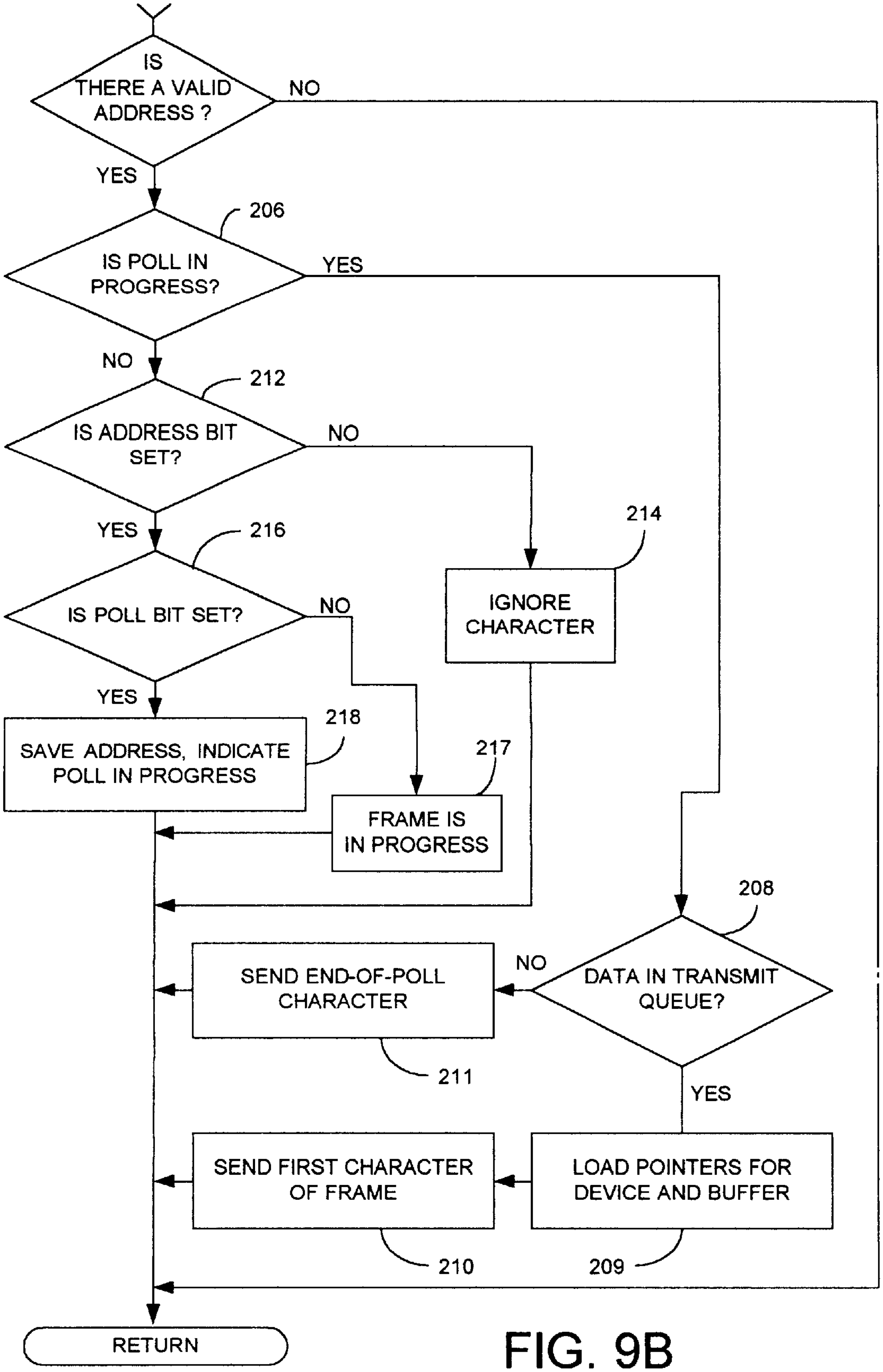

FIGS. 9A and 9B show an exemplary method for performing a link data receive interrupt service routine (ISR) 190 to achieve the actual communication of data from the POS terminal through the adapter to an external device such as a peripheral. Upon occurrence of an interrupt signal, a character that has been read is transmitted from the receive buffer at block 192. It is then determined at decision block 194 whether a data frame is already in progress. If a frame is in progress, pointers are loaded for the current external device and buffer at block 196, and the character is saved in the device buffer at block 198. Next, it is determined whether the character is an end-of-frame character at decision block 200, and if the character is an end-of-frame character, the frame's validity is determined at block 202. If a valid end-of-frame character is detected, and a cyclic redundancy calculation (CRC) indicates that the frame is valid, the link driver notifies the main control loop that a message frame is available at block 203, and the routine returns to its quiescent state of waiting for an interrupt indicating the presence of another character in the receive buffer. If no valid end-of-frame character is detected, the frame is ignored as indicated by block 204 (meaning that no special messages need to be communicated by the link driver), and the routine returns to wait for another character.

If there is no frame currently in progress when an interrupt request is serviced, it is then determined at decision block 205 whether there is a valid address in the data being received. If not, the routine returns to wait for another interrupt request. If there is a valid address, it is then determined at block 206 whether a poll is currently in progress. If a poll is in progress, it is further determined whether there is data in the transmit queue, as represented by decision block 208. If there is data in the transmit queue, pointers are loaded to indicate the appropriate device and buffer at block 209 and the first character of the frame is transmitted at block 210. Then, the routine returns to its quiescent state, and a link transmit service routine will be called to handle transmission of characters from the device and/or adapter to the attached POS terminal. If there is no data in the transmit queue, an end-of-poll character is sent at block 211 and the routine returns to wait for another interrupt request to service.

If there is no frame in progress and no poll in progress, it is determined at decision block 212 whether an address bit has been set. In an exemplary 9-bit character, the most significant bit is the address bit and the next-most significant bit is the poll bit, followed by seven data bits representing the character itself. If the address bit is not set, the character read from the receive buffer is ignored, and the routine returns to its quiescent state. If the address bit has been set but a poll bit has not been set, as determined by decision block 216, the routine indicates that a frame is now in progress at block 217. If the address bit and the poll bit have been set, indicating that the POS terminal is initiating communication by sending a poll character, the address is saved and a signal is sent indicating that a poll is in progress, as represented by block 218.

Figure 10:
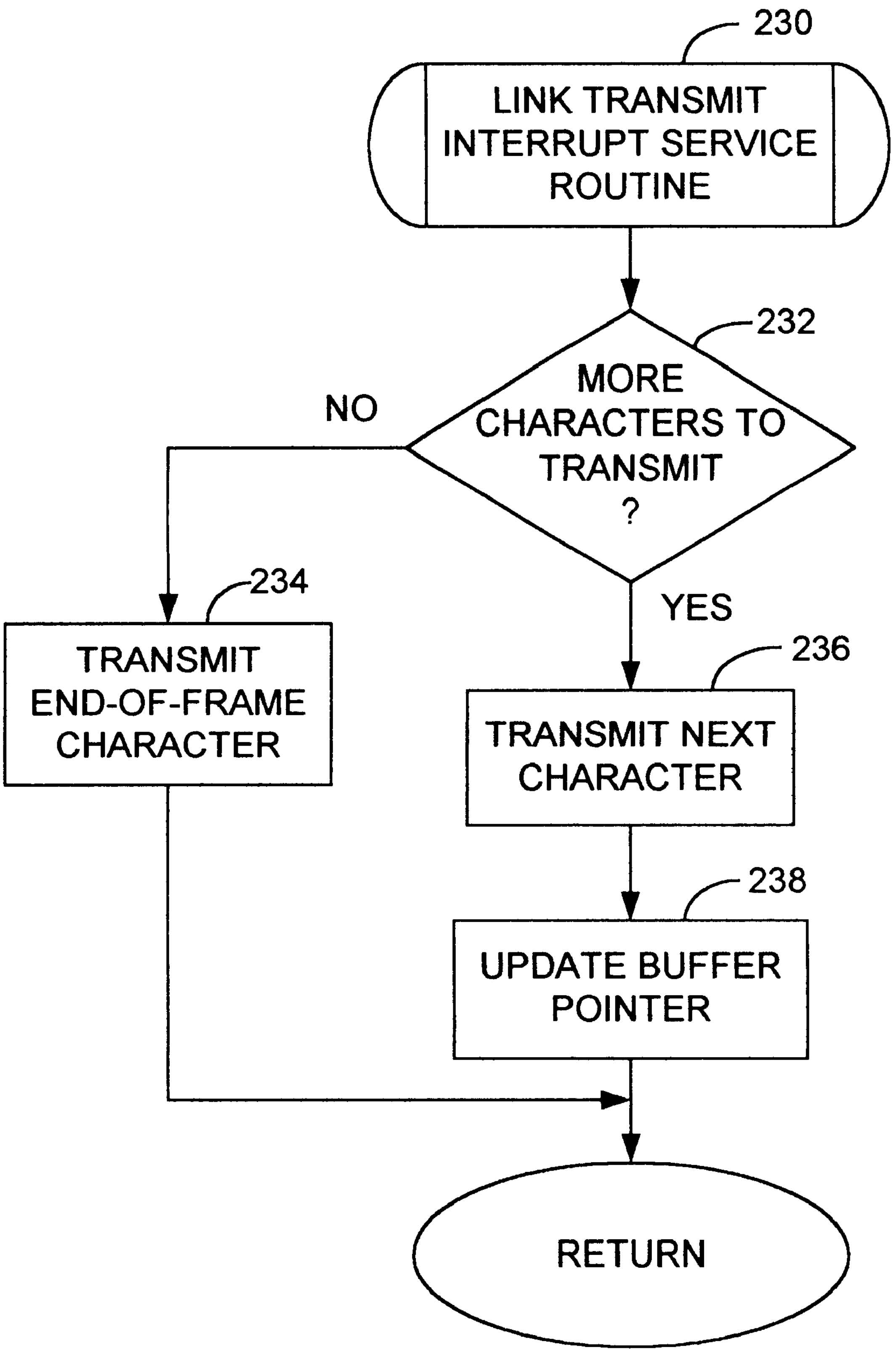
FIG. 10 is a flow diagram illustrating the method and decision steps implemented by a link transmit interrupt service routine of the protocol converter/print share device of the present invention.

FIG. 10 shows an exemplary method for performing a link data transmit interrupt service routine (ISR) 230 to achieve the actual communication of data from the adapter and an external device such as a peripheral to a POS terminal. It is initially determined upon servicing an interrupt whether there are more characters to transmit, represented by decision block 232. If there are not, an end-of-frame character is transmitted at block 234 and the ISR is completed. If there is a character to transmit, the next character is transmitted at block 236 and the buffer pointer is updated at block 238, completing the ISR.

It will be appreciated by one skilled in the art, based on the flow diagrams shown in FIGS. 8A, 8B, 9A, 9B and 10, how the functional blocks of protocol converter/print share device 30 (FIG. 6) and protocol converter 40 (FIG. 7) interact with one another to accomplish the objectives described above with respect to FIGS. 6 and 7. The other functions shown and described with respect to FIGS. 6 and 7 may be achieved by software designed with similar characteristics to those explained above with respect to the flow diagrams of FIGS. 8A, 8B, 9A, 9B and 10, with the particular details of the software being left to the discretion of the skilled artisan. The exact implementation of the software for performing the methods and functions described are within the expertise of one skilled in the art, and any other modified methods of achieving the above-described functions are within the scope of the present invention.

The adapter technology of the present invention provides an arrangement and inter-relationship of functions and communication that significantly enhance the ability of an existing POS terminal to operate with a variety of external devices. Even external devices of a type with which POS terminals were never designed to function may be accessed and utilized with the present invention. For example, peripheral devices or even additional memory may be provided to the POS terminal. This access is seamless to the POS terminal, since the adapter provided by the present invention emulates a feature card (such as feature C) through which the POS terminal may be programmed to communicate, or simply sniffs data and signals from the POS terminal directly. The adapter then transforms data and commands into instructions in a predetermined format (such as standard ASCII format) for operating the external device, which may be nearly any computer-related device, such as a printer, a barcode scanner, a display, a keyboard, a memory, a smart card reader, a biometric device such as a fingerprint reader, a signature capture device, or another type of device. The external device may be a PC client of some kind, which itself can support a plurality of peripheral devices and can communicate in real-time with many other types of computers, such as the controller managing operation of a POS network (this example is depicted in FIG. 3). Additionally, the adapter may be provided with the capability to detect signal patterns occurring in the POS terminal itself and to perform functions and transmit instructions to external devices on the basis of the signal patterns detected in the POS terminal. The signal patterns may be the result of keystrokes on the terminal, or any number of events occurring in the terminal which are desired to trigger particular actions by one or more devices coupled to the adapter. The above-described capabilities are provided by the present invention without interrupting the flow of signals or data in the existing POS computer system, by directly monitoring the communication bus of the POS terminal and executing functions based on a recognized pattern of signals. Thus, the present invention represents an extremely versatile device and method for adapting a POS terminal to communicate and operate with a variety of external devices, and with multiple types of devices at the same time, while sniffing data and signal patterns and transmitting data to emulate supported devices or the operation of a feature card. Further, the adapter of the present invention is programmable to provide these capabilities for any combination of devices desired by the end user. The capabilities of the present invention are not application-specific; that is, the present invention applies to older POS terminals as well as new proprietary POS terminals, to enable non-supported devices to operate with the POS terminals. These features are not provided by any device or method, along or in combination, in the prior art.

Appendix A describes in detail the format of records transmitted from the protocol converter to operate the external device attached thereto in an exemplary embodiment of the present invention. Appendix B describes in detail the feature C emulation protocol performed in an exemplary embodiment of the present invention. While the present invention is described herein with reference to preferred embodiments, workers skilled in the art will recognize that changes may be made in form and detail without departing from the spirit and scope of the invention.

APPENDIX A

Exemplary Record Format for Protocol Conversion

A-1 Physical Characteristics

Data is transmitted using a baud rate (which is configurable) of 38,400 with 8 data bits, no parity, and 1 stop bit (38400,8,N,1).

A-2 Record Format

All characters contained in the record are within the printable ASCII character set (0×20–0×7e). The complete record is shown below.

| device indicator | status data | data separator | device data | EOR |
|---|---|---|---|---|
| (1 char) | (0–5 | (':') | (up to ? | (<cr><nl>) |

-continued

| device indicator | status data | data separator | device data | EOR |
|---|---|---|---|---|
| | chars) | | chars) | |

The different fields are discussed below followed by detailed descriptions for each device.

A-2.1 Record Fields

A-2.1.1 Device Indicator

The first character of the record indicates either a device or error condition. Below are examples of such codes.

| | |
|---|---|
| D | Display data |
| K | Keyboard data |
| P | Printer data |
| S | Shopper display |
| B | Bar-code data |
| E | Error condition |

A-2.1.2 Status Data

The second field of the data record qualifies device data, if needed. This field is optional but does have a predefined fixed length for each device.

A-2.1.3 Data Separator

The data separator is an ASCII colon (':') used to easily distinguish device ID and status from device data.

A-2.1.4 Device Data

Device data is the data that has been either transmitted or received by the device. All data is converted to its ASCII equivalent by the sniffer. Data is represented either as an ASCII character string or as hexadecimal numbers. Strings are enclosed with double quotes at both the beginning and end of the string. This allows white spaces to be seen when viewed on paper. Numbers are separated with a space ("or 0×20). See device specific sections for more details.

A-2.1.5 End-of-Record (EOR)

The EOR is a carriage return (<cr>,'\r', or 0×0D) followed by a newline (<n1>, '\n', or 0×0A).

A-2.2 Keyboard Data

Keyboard data is represented using hex numbers. No additional status data is available for the keyboard. The data field contains from 2 to 4 status bytes (depending on keyboard type) followed by the make/break sequences for the key codes. The record format for the keyboard is shown below.

| K | : | data | EOR |
|---|---|---|---|

A-2.2.1 Examples

The following examples indicates the make/break sequence for the 24 (1) key.

K: 00 04 7E

K: 00 04 F0 7E

A-2.3 Printer

There are 6 additional status characters for the printer. The first status character indicates which print station the data is targeted. The second character indicates the font. Characters 3–4 indicates the decimal value for the number of line feeds associated with this print. Characters 5–6 indicate the decimal value for the number of dot rows per line feed. Below is the record format for the printer.

| P | Font | Station | Linefeeds | dots/LF | : | data | EOR |
|---|---|---|---|---|---|---|---|
| | (1 char) | (1 char) | (2 chars) | (2 chars) | | | |

A-2.3.1 Font

Font codes are shown in the table below.

| | |
|---|---|
| N | normal |
| E | emphasized |

A-2.3.2 Station

Station codes are shown below.

| | |
|---|---|
| C | cash receipt |
| J | journal tape |

A-2.3.3 Examples

The following example is for a normal print to the cash receipt with 01 linefeeds and 12 dots per line feed.

PNC0112:"Item Number 1 1.00 B"

A-2.4 Display

Display data contains one additional status character indicating the line of the display. Below is the record for the display.

| D | Line | : | data | EOR |
|---|---|---|---|---|
| | (1 char) | | | |

A-2.4.1 Examples

Below is an example for 2 lines of data sent to the display.

D1:"R2 CORPORATION"

D2:"TRUE FREEDOM"

A-2.5 Barcode

Barcode data shows data sent from a barcode reader device (e.g., handheld scanner) to the terminal. The device byte is followed by 4 bytes of additional information. These 4 bytes indicate the 2 status bytes associated with the barcode data. These bytes are transmitted for future reference. The barcode data is an ASCII string.

| B | Status 0 | Status 1 | : | data | EOR |
|---|---|---|---|---|---|
| | (2 chars) | (2 chars) | | | |

A-2.5.1 Examples

Below is an example for a barcode exchange.

B2001:"042283822023"

A-2.6 Shopper Display

Shopper display is information set to the "Retail Shopper Display". The shopper display contains up to 9 ASCII characters and 6 status LEDs. Shown below is the data record for the shopper display.

| S | LED status | : | data | EOR |
|---|---|---|---|---|
| | (2 chars) | | | |

The LED status is represented using 2 ASCII characters indicating the hex value of the LEDs. Shown below are bit definitions for the LED status byte. Bit 0 is the least significant bit.

| Bit | LED |
|---|---|
| 0 | Not labeled on display |
| 1 | MISC AMOUNT |
| 2 | REFUND |
| 3 | CHANGE |
| 4 | AMOUNT DUE |
| 5 | ITEM SALE |
| 6 | N/A |
| 7 | N/A |

A-2.6.1 Examples

Below is an example for shopper display data. The first line indicates an item sale of 1.00. The second line shows a change of 0.95.

S20:"1.00"

S08:"0.95"

A-2.7 Error Conditions

Errors may occur while sniffing data. Possible errors include data overrun on the link, data overrun on the async port and corrupted frames on the link. An error condition is indicated with the following record. The device code corresponds to the supported device codes. Error information is a list of numbers (TBD).

| E | Device | : | Additional error info | EOR |
|---|---|---|---|---|
| | (1 char) | | | |

A-3 Supported Devices

The protocol converter may be designed to support at least the following devices.

| Hex Address | Device |
|---|---|
| 0x10 | Keyboard A |
| 0x1C | Keyboard B |
| 0x20 | AND display |
| 0x27 | Shopper display |
| 0x34 | MOD3/4 printer |
| 0x4B | Handheld scanner |

A-4 Example Session

```
K: 00 04 4D
D1:"**R2 CORPORATION** "
D2:" TRUE FREEDOM "
K: 00 04 F0 4D
K: 00 04 7E
D2:"          1"
K: 00 04 F0 7E
```

-continued

```
K: 00 04 AF
K: 00 04 F0 AF
PNC0112:"  Item Number 1       1.00 B"
D1:"ITEM NUMBER 1    "
D2:"          1.00"
K: 00 04 0E
D2:"          2"
K: 00 04 F0 0E
K: 00 04 AF
K: 00 04 F0 AF
PNC0112:"  Item Number 2       2.00 B"
D1:"ITEM NUMBER 2    "
D2:"          2.00"
K: 00 04 BF
D1:"TAX DUE    .14"
D2:"TOTAL    3.14"
K: 00 04 F0 BF
K: 00 04 7F
D2:"          4"
K: 00 04 F0 7F
K: 00 04 0D
D2:"          40"
K: 00 04 F0 0D
K: 00 04 0D
D2:"          400"
K: 00 04 F0 0D
K: 00 04 8E
D2:"          4.00"
PNC0112:" ****TAX    .14 BAL    3.14 "
D1:"CASH    4.00"
D2:"CHANGE    .86"
K: 00 04 F0 8E
PNJ0112:" ****TAX    .14 BAL    3.14 "
PNJ0112:"  Cash        4.00 "
PNC0112:"  Cash        4.00 "
PNC0112:"  CHANGE        .86 "
PNJ0112:"  CHANGE        .86 "
PNJ0112:"          394.11"
PNJ0112:"3/05/80 09:45 0001 01 0078 1    "
PNC0112:"3/05/80 09:45 0001 01 0078 1    "
PNC0112:" EARNING YOUR BUSINESS EVERYDAY! "
PNC0912:"      CALL TOLL FREE        "
PNC0112:" ** R2 CORPORATION ** "
PNC0312:" ** TRUE FREEDOM ** "
```

APPENDIX B

Feature Emulation Protocol

B-1 Overview

Devices found in the protocol converter line perform many functions. Some devices emulate legacy IBM peripherals, requiring no custom programming on the IBM terminal. Other devices, however, require the terminal application to be updated to fully utilize such features as the electronic journal, flash disk, and printer pass-thru functions. This document describes the programming interface for the protocol converter and print share devices.

Many of the properties associated with the protocol converter and print share devices are configurable by downloading a parameters file into flash memory.

B-2 Operating Modes

B-2.1 MOD3/4 Emulation

The print share device fully emulates an IBM MOD4 printer. This parameter can not be configured for the print share device and is always active, responding to device address 0×34.

B-2.2 Protocol Converter

The protocol converter is capable of converting proprietary IBM peripheral data into ASCII data. Examples of supported devices are shown in the table below.

B-2.3 Feature 'C' Card Emulation

B-2.3.1 Enhanced Mode

The print share device and protocol converter may logically contain multiple devices. For example, the print share device may appear on the IBM Serial I/O channel a both a MOD4 printer and an enhanced Feature ‘C’ Card (FCC). The enhanced FCC, in turn, may also support multiple devices (the term “enhanced feature C emulation software” is used when referring to the enhanced FCC). For example, the terminal application accesses the flash disk and electronic journal data by writing/reading to the enhanced feature C emulation software. The terminal application uses the standard Feature ‘C’ device driver for communicating with all enhanced feature C devices. Data that is sent to the enhanced feature C emulation software must follow the rules specified in the “Enhanced Feature C. Application Protocol” section.

B-2.3.2 Native Mode

The native mode of operation for the FCC fully emulates a standard IBM Feature C expansion card. When the device is configured for native mode, all data sent to the FCC is sent unchanged to the RS-232 port. Data read by the FCC is passed unchanged to the terminal application. Port settings and all other FCC characteristics are defined by the terminal application. The FCC native mode is supported on the protocol converter. Both native and enhanced FCC may be active simultaneously on the protocol converter (each with a different address).

B-3 Enhanced Feature C Application Protocol

B-3.1 Overview

The terminal application and enhanced feature C emulsion software communicate over the IBM link using a specific set of rules, referred to as the application protocol. Data exchanged between the terminal and enhanced feature C emulation software must always adhere to these groundrules or the device will fail to operate as expected.

B-3.2 Enhanced Feature C Packet

The terminal application sends data to the enhanced feature C emulation software through the FCC driver. Data is sent using the WRITE command and read using the READ command. Data sent between the terminal and enhanced feature C emulation software over the IBM link is referred to as an enhanced feature C packet. The maximum size for the packet is 247 bytes as dictated by the FCC. The packet consists of a header followed by device specific data. The enhanced feature C packet is shown below.

| Enhanced Feature C Packet (max 247 bytes) | |
|---|---|
| Header | Data |

B-3.2.1 Enhanced Feature C Header

Since the enhanced feature C emulation software supports multiple devices, there must be a method of specifying which device is being targeted during any given transaction. This is accomplished by placing a header of information in front of the device specific data. The header contains 2 bytes of information. The first byte is the destination device sub-address and the second byte specifies the overall length of the entire data packet being sent. The header is shown below.

| Enhanced Feature C Header (2 bytes) | |
|---|---|
| Device | Length |

B-3.2.1.1 Device Sub-Addresses

Devices and sub-addresses are shown below.

| Device | Value | Description |
|---|---|---|
| CORE | 0x01 | Feature C Emulation Software (CORE) |
| FDISK | 0x02 | Flash Disk |
| EJRNL | 0x03 | Electronic journal |
| PRINTER | 0x04 | Non-legacy printer |
| RS-232 | 0x05 | Non-legacy cash drawer |
| RS-232 | 0x06 | RS-232 port |

B-3.2.1.2 Packet Rejection

The device will reject a packet sent with an incorrect length field. The device will respond with a single byte “NACK” of value 0×FF when this occurs.

B-3.2.2 Enhanced Feature C Data

The data portion of the enhanced feature C (CORE) packet contains device specific data. The actual format of the data may vary depending on which device is being accessed. For some devices, the data may also contain a header of information followed by data. This is illustrated below.

| Pckt Header | Device Header | Device Data |
|---|---|---|

Typical Enhanced Feature C (CORE) Packet

B-4 Enhanced Feature C Devices

B-4.1 Overview

As mentioned earlier, the enhanced feature C emulation software may support multiple devices. Some of these devices are directly addressable on the IBM 1 ink. For example, the print share device responds directly on the link to the MOD4 and FCC addresses. Other devices, however, are accessed through the enhanced FCC.

B-4.2 Enhanced Feature C Emulation Software

Some commands are generic to the enhanced feature C emulation software and do not apply to any specific device. These commands fall under the diagnostic and configuration categories.

B-4.2.1 Packet

The enhanced feature C (CORE) packet contains header information followed by data as shown below.

Packet HeaderCORE HeaderCORE DataCORE Packet

B-4.2.2 Header

The header provides a means for the terminal application to send commands and receive status to/from the enhanced feature C emulation software. Header detail is shown below (all are byte quantities).

| Enhanced Feature C (CORE) Header Information | | | |
|---|---|---|---|
| Command | Flags | Reserved | Length |

B-4.2.3 Command

The command field of the header defines which operation is to take place. The terminal application always specifies a command when sending data to the enhanced feature C emulation software. Shown below are the commands supported by the enhanced feature C emulation software.

| Command | Value | Description |
|---|---|---|
| CORE_VERSION | 0x01 | Request the software version |
| CORE_LINK | 0x02 | Request the link number |

B-4.2.3.1 CORE_VERSION

The CORE_VERSION command requests the software version of the unit. The response is contained is an ASCII string (not NULL terminated) contained in the data field. The length of the string is indicated in the length field.

B-4.2.3.2 CORE_LINK

This command returns the link number for the requesting terminal. This command can be used in a multi-link configuration such as that with the print share device for determining which link is connected. The link number is returned in the flags field.

B-4.2.4 Flags

The flags field is used to indicate status and pass additional information.

B-4.3 Flash Disk

The terminal application uses the Flash Disk (FDISK) much like it would use any ordinary file system. Commands such as read, write, rewind, etc. are supported by the FDISK for accessing data store on the flash card.

B-4.3.1 File System

The Flash Disk File System (FDFS) closely resembles industry standard file systems such as MS-DOS and UNIX.

B-4.3.1.1 Directories

The FDFS supports a single, flat directory structure. All files are contained within this single directory. For the print share device, there is no separation of files between the two terminals. The terminal application is responsible for defining filenames that are unique between terminals if separate files are desired (e.g., create filenames based on the terminal number). Using a single file system provides greater flexibility and allows the terminals to perform such functions as consolidating files and accessing data for off-line terminals.

b-4.3.1.2 Files

The FDFS supports user definable files. Files are assigned names by either the user or enhanced feature C emulation software (e.g., a file named "EJRNL_1" for the electronic journal data associated with terminal #1 will be created automatically if the EJ is enabled). The maximum number of characters contained in a filename is 14 (long filenames will be truncated to 14). All printable ASCII characters except for '/','\r', "(space) and '\n' are acceptable for filenames and are case insensitive (all characters are changed to uppercase by the FDFS). Filenames "." and ".." are reserved for future support of directory structures. Shown below are example filenames.

SignCard.img valid signcard/img invalid character

EJ1.TXT valid toolongofa.name invalid length (truncated to toolongofa.nam) reserved for system use The maximum file size is determined by the FSISK configuration (2–16 MB). The size of the user file is dynamically maintained by the FDFS, automatically increasing as the user performs writes. Up to 16 user defined files may be created.

B-4.3.2 Packet

The FDISK packet contains header information followed by data as shown below.

| FDISK Packet | | |
|---|---|---|
| Pckt Header | FDISK Header | FDISK Data |

B-4.3.3 Header

The header provides a means for the terminal application to send commands and receive status to/from the FDISK. Header detail is shown below (all are byte quantities).

| FDISK Header Information | | | |
|---|---|---|---|
| Command | Flags | File | Length |

B-4.3.4 Command

The command file of the header defines which operation is to take place. The terminal application always specifies a command when sending data to the FDISK. Shown below are the commands supported by the FDISK.

| Command | Value | Description |
|---|---|---|
| FDISK_OPEN | 0x01 | Open a file |
| FDISK_CREATE | 0x02 | Create a file |
| FDISK_CLOSE | 0x03 | Close a file |
| FDISK_DELETE | 0x04 | Delete a file |
| FDISK_WRITE | 0x05 | Write to a file |
| FDISK_READ | 0x06 | Read from a file |
| FDISK_SEEK | 0x07 | Seek the file pointer to a specified byte index |
| FDISK_POS | 0x08 | Return the current file pointer position |
| FDISK_REWIND | 0x09 | Seek the file pointer to the beginning of the file |
| FDISK_STAT | 0x0A | Get file status |
| FDISK_RENAME | 0x0B | Rename a file |
| FDISK_READDL | 0x0C | Read to a specified delimiter |
| FDISK_DIR | 0x0D | Read directory list |

The FDISK replies to all commands that are initiated by the terminal application. The terminal application must verify that the FDISK has returned a successful completion status after each operation. The status of the command is reflected in the flags field. All commands return a flags value of zero for success unless otherwise noted.

B-4.3.4.1 FDISK_OPEN

This command opens a file for reading/writing. If the file exists, the file is opened in append mode with the file pointer positioned at the end of file. If the file does not exist, a new file is created. The filename is specified in the data field with the string length specified in the length field. The file number is returned in the file field. This number must be used with all subsequent commands.

B-4.3.4.2 FDISK_CREATE

This command creates a new file. If the file already exists, it is deleted and recreated. The device responds with the file number in the file field.

B-4.3.4.3 FDISK_CLOSE

This command closes the file indicated in the file field.

B-4.3.4.4 FDISK_DELETE

This command deletes the file specified in the file field.

B-4.3.4.5 FDISK_WRITE

This command writes to the file specified in the file field starting at the current file offset. The amount of data to be written is defined in the length field with data contained in the data field.

B-4.3.4.6 FDISK_READ

This command reads data from the specified file starting at the current file offset. The maximum amount of data to read is specified in the length field. The number of bytes returned is specified in the length field on the reply. The device may return less data than requested if the end-of-file is reached. Data is contained in the data field. Trying to read pass the EOF returns an FD_EOF flags value.

B-4.3.4.7 FDISK_SEEK

This command seeks the file pointer to the offset specified in the data field. The data field must contain a 4-byte Intel-format integer.

B-4.3.4.8 FDISK_POS

This command requests the current file position. The device responds to this command with a 4-byte Intel-format integer in the data field.

B-4.3.4.9 FDISK_REWIND

This command sets the file position to zero.

B-4.3.4.10 FDISK_STAT

This command requests the current statistics for file specified. Shown below is the format of data returned from the device.

FSTAT Information

| Flags | Filename | Size | Position |
|---|---|---|---|
| (1 byte) | (15 bytes) | (4 bytes) | (4 bytes) |

A flags value of 0×80 indicates a valid file. The filename is a 15 byte NULL-terminated string and size and position values are 4-byte Intel-format integers.

B-4.3.4.11 FDISK_RENAME

This command renames the current file. The new filename is specified in the data field with the length of the string determined by the length field.

B-4.3.4.12 FDISK_READDL

Reserved for future support.

B-4.3.4.13 FDISK_DIR

This command returns the list of all valid files. Each filename in the list is separated by a "space (0×20) character. The total length of the list is specified in the length field.

B-4.3.5 Flags Field

The flags field is used to qualify the command sent by the terminal application or indicates a status result when returned by the FDISK. The FDISK returns status information in the flags field. Flag values are shown below in the table below.

| Flag | Value | Description |
|---|---|---|
| FDISK_OK | 0 | Operation successful |
| FDISK_INVALID_FILE | −1 | Invalid file specified |
| FDISK_EOF | −2 | End of file reached |
| FDISK_INVALID_POS | −3 | Invalid position specified |
| FDISK_FAIL | −4 | Misc error has occurred |
| FDISK_INVALID_CMD | −5 | Unknown command specified |
| FDISK_DISK_FULL | −6 | No more space on disk |
| FDISK_BLOCK_ERR | −7 | Fatal block error |
| FDISK_BAD_FNAME | −8 | Bad filename |

B-4.3.6 File Field

The file field is used by the terminal application to define which file is being operated on. The user must first open or create a file in order to retrieve a valid file number. Once a file number is obtained, it must be specified in the file field for all subsequent operations. The FDISK returns the file number in the file field following the open or create command.

B-4.3.7 Length Field

The length field specifies the amount of data that is to be processed. On a write operation, the length field would typically equal the amount of data contained in the data portion of the packet. This corresponds to the total number of bytes to be written to the FDISK. On a read operation, the length field specifies the total number of bytes requested from the FDISK (starting at the current byte position). The maximum length is 247 bytes less the R*Core and FDISK header sizes, or 241 bytes.

B-4.3.8 Data Field

The data portion of the packet contains "raw" data. For the WRITE command, this would be the binary data that is to be written to the FDISK. For the READ operation, this field would contain data returned from the FDISK. For the SEEK and POS commands, the data field contains a 4 byte Intel format (32 bit) binary value indicating the byte offset from start of file. For the FDISK_FAIL status, the data field may contain additional binary data relevant to the error condition.

B-4.4 Electronic Journal

B-4.4.1 Overview

The flash memory may be used to store and retrieve journal data. The journal data can be accessed in two ways. First, the journal data can be accessed through the FDISK device by opening the file named "EJRNL_x" (where x is 0 or 1 depending on the like number). And secondly, the journal data can be sent to the cash receipt or RS-232 port. The journal packet is shown below.

Journal Packet

| Pckt Header | JRNL Command | JRNL Flags |
|---|---|---|

B-4.4.2 Commands

The electronic journal supports several commands for controlling journal data. The flags field may be used to qualify a command. Shown below are the command values.

| Command | Cmd Value | Flags | Description |
|---|---|---|---|
| EJRNL_STATE | 0x01 | 0x00 | Turn the journal capture OFF |
| EJRNL_STATE | 0x01 | 0x01 | Turn the journal capture ON |
| EJRNL_PRINT | 0x02 | NA | Send journal data to the cash receipt |
| EJRNL_RESET | 0x03 | NA | Reset journal data |
| EJRNL_RS232 | 0x04 | NA | Send data to RS-232 port (not yet supported) |

B-4.5 Non-Legacy Printer

The terminal application can send commands directly to the enhanced feature C emulation software and the print handler by specifying the printer device. This feature allows the terminal to fully utilize all features of the RS-232 printer without being limited by the MOD4 command set.

B-4.5.1 Packet

The PRINTER packet contains header information followed by data as shown below.

PRINTER Packet

| Pckt Header | PRINTER Header | PRINTER Data |
|---|---|---|

B-4.5.2 Header

Header detail is shown below (all are byte quantities).

| PRINTER Header Information | | | |
|---|---|---|---|
| Command | Flags | Reserved | Length |

B-4.5.3 Command

The command field of the header defines which operation is to take place. The terminal application always specifies a command when sending data to the PRINTER. Shown below are the PRINTER commands.

| Command | Value | Description |
|---|---|---|
| PRINTER_PTHRU | 0x01 | Send attached data to printer |
| PRINTER_EJECT | 0x02 | Send print buffer to printer |
| PRINTER_STATUS | 0x03 | Request real-time printer status |
| PRINTER_TYPE | 0x04 | Request printer type |
| PRINTER_AUTO_EJECT | 0x05 | Enable/Disable auto eject |
| PRINTER_LABEL | 0x06 | Define the cash receipt label |

B-4.5.3.1 PRINTER_PTHRU

This command passes data directly to the printer. The flags field determines the type of print operation. Available options are PRT_IMMEDIATE and PRT_BUFFERED. The PRT_IMMEDIATE flag indicates that the attached data is to be passed directly to the printer immediately. The PRT_BUFFERED flag results in data being appended to the R-Print internal print buffer. Two separate print buffers are maintained for the R-Print device (one for each link). The appropriate buffer is automatically determined by the R-Print application. Printer data greater than 241 bytes can be passed using multiple pass-thru commands. Care must be taken to insure that multiple packets are contiguous. For example, no MOD4 prints should occur while sending multiple buffered packets since the MOD4 data would be interleaved in the print buffer. Issues may also arise concerning the sequence that data is presented onto the serial IO link. For example, a write to the MOD4 driver followed by a write to the Feature C driver may result in Feature C data arriving before the MOD4 data. The TCLOSE instruction should be used by the terminal application in order to flush device buffers.

| Flags | Value | Description |
|---|---|---|
| PRT_IMMEDIATE | 0x01 | Send data to printer immediately |
| PRT_BUFFERED | 0x02 | Send data to print buffer |

B-4.5.3.2 PRINTER_EJECT

This command sends all buffered cash receipt data to the printer.

B-4.5.3.3 PRINTER_STATUS

This command requests the real-time status from the printer. The status is returned in the data field.

B-4.5.3.4 PRINTER_TYPE

This command returns the printer type in the flags field. Shown below are exemplary flags values for this command.

| Flags | Value | Description |
|---|---|---|
| PRT_EP_T88 | 0x20 | Epson T88 |
| PRT_EP_H5000 | 0x0F | Epson H5000 |
| PRT_AX_7156 | 0x26 | Axiohm 7156 |
| PRT_AX_7193 | 0x03 | Axiohm 7193 |
| PRT_IBM_4610 | 0x30 | IBM 4610 |
| PRT_UNKNOWN | 0xFF | Unknown printer |

B-4.5.3.5 PRINTER_AUTO_EJECT

This command enables or disables the auto eject feature. If auto-eject is enabled, the receipt paper will automatically eject and cut whenever a CUT_PAPER command is sent to the MOD4 printer. When auto-eject is disabled, the print share device will buffer all data until the PRINTER_EJECT command is received. The auto-eject mode is specified using the flags field.

| Flags | Value | Description |
|---|---|---|
| PRT_EJECT_ENABLED | 0x01 | Enable auto-eject |
| PRT_EJECT_DISABLED | 0x00 | Disable auto-eject |

B-4.5.3.6 PRINTER_LABEL

This command allows the terminal application to define a label that prints at the top of the cash receipt each time the buffer is sent to the RS-232 printer. The text for the label is passed in the data field with the length of the label specified in the length field. The label can contain escape characters if desired. The current maximum label length is 19 characters. Default labels are "REGISTER 0" and "REGISTER 1".

B-4.5.4 Flags

The flags field is used by the PRINTER to return pass/fail codes and to qualify printer commands.

B-4.6 RS-232

The RS-232 port may be written to and read directly by specifying the sub-address of 0×06. This applies to both R-Print and R-Pro. Shown below are the command values for this device.

| Command | Value | Description |
|---|---|---|
| RS232_WRITE | 0x00 | Send data to RS-232 port |
| RS232_READ | 0x01 | Read data from RS-232 port |

B-5 Device/Command Summary

| Device | Device Addr | Command | Cmd Value |
|---|---|---|---|
| CORE | 0x01 | CORE_VERSION | 0x01 |
| | | CORE_LINK | 0x02 |
| FDISK | 0x02 | FDISK_OPEN | 0x01 |
| | | FDISK_CREATE | 0x02 |
| | | FDISK_CLOSE | 0x03 |
| | | FDISK_DELETE | 0x04 |
| | | FDISK_WRITE | 0x05 |
| | | FDISK_READ | 0x06 |
| | | FDISK_SEEK | 0x07 |
| | | FDISK_POS | 0x08 |
| | | FDISK_REWIND | 0x09 |
| | | FDISK_STAT | 0x0A |
| | | FDISK_RENAME | 0x0B |

-continued

B-5 Device/Command Summary

| Device | Device Addr | Command | Cmd Value |
|---|---|---|---|
| | | FDISK_READDL | 0x0C |
| | | FDISK_DIR | 0x0D |
| EJRNL | 0x03 | FDISK_STATE | 0x01 |
| | | FDISK_PRINT | 0x02 |
| | | FDISK_RESET | 0x03 |
| | | FDISK_RS232 | 0x04 |
| PRINTER | 0x04 | PRINTER_PTHRU | 0x01 |
| | | PRINTER_EJECT | 0x02 |
| | | PRINTER_STATUS | 0x03 |
| | | PRINTER_TYPE | 0x04 |
| | | PRINTER_AUTO_EJECT | 0x05 |
| | | PRINTER_LABEL | 0x06 |
| RS232 | 0x06 | R5232_WRITE | 0x00 |
| | | R5232_READ | 0x01 |

B-6 Example Code

Shown below are code fragments in IBM Basic for accessing the enhanced feature C emulation software.

```
!************************
FUNCTION send(pkt.addr%,cmd%,flags%,file%,wr.len%,
  rd.len%,data$)
!************************
  integer*1 pkt.addr%,cmd%,flags%,file%,pkt.len%,
    wr.len%,rd.len%
  string data$,fmt$
  on error goto r2.error
  pkt.len%=6+wr.len%
  if wr.len%>0 then \
  begin
    fmt$="6I1,C"+str$(wr.len%)
    write form fmt$;#48;\
      pkt.addr%,\
      pkt.len%,\
      cmd%,\
      flags%,\
      file%,\
      wr.len%,\
      data$
  endif \
  else \
  begin
    fmt$="6I1"
    write form fmt$;#48;\
      pkt.addr%,\
      pkt.len%,\
      cmd%,\
      flags%,\
      file%,\
      rd.len%
    endif
  wait; 50
EXIT FUNCTION
!************************
FUNCTION chk.flags(msg$)
!************************
  integer*1 chk.flags,r2.flags%,count%,ret%
  string msg$,tmpdata$
  chk.flags=0
  ! Wait for a complete packet or timeout
  count%=0
  r2.data$=""
  read #48; line r2.data$
  while len(r2.data$)<6 AND count%<50
    wait; 100
    read #48; line tmpdata$
    r2.data$=r2.data$+tmpdata$
    count%=count%+1
  wend
  if (len(r2.data$))<6 then \
    begin
      r2.data$="Timeout waiting for data"+chr$(10)+chr$
        (13)
      call send(RS232,RWRITE,0,0,len(r2.data$),0,
        r2.data$)
      r2.data$=""
      exit function
    endif
  r2.flags%=asc(mid$(r2.data$,4,1))
  if r2.flags%<0 then \
    begin
      r2.data$="Flags="+str$(r2.flags%)+"for"+msg$+
        chr$(10)+chr$(13)
      call send(RS232,RWRITE,0,0,len(r2.data$),0,
        r2.data$)
    endif \
    else \
      chk.flags=len(r2.data$)
END FUNCTION
!************************
SUB fdisk.test
!************************
integer*1 r2.count,ret
  ! open file
  r2.data$="test1"
  call send(FDISK,FOPEN,0,0,len(r2.data$),0,r2.data$)
  ret=chk.flags("open")
  if ret>5 then \
    r2.file%=ASC(mid$(r2.data$,5,1))\
  else \
    exit sub
  ! write file info to printer
  r2.data$="Test file number is"+str$(r2.file%)+chr$(10)
  call send(PRINTER,PRT.PTHRU,PRT.IMMED,0,len
    (r2.data$),0,r2.data$)
  call chk.flags("print file number")
  ! rewind file
  call send(FDISK,FREWIND,0,r2.file%,0,0,r2.data$)
  call chk.flags("rewind")
  ! read test sequence number from file
  call send(FDISK,FREAD,0,r2.file%,0,5,r2.data$)
  ret=chk.flags("read")
  ! write test sequence number to printer
  if ret>10 then \
    begin
      r2.data$="Test sequence number is"+mid$(r2.data$,
        7,5)+chr$(10)
      call send (PRINTER,PRT.PTHRU,PRT.IMMED,0,
        lens(r2.data$),0,r2.data$)
      call chk.flags("pthru")
    endif
  ! increment seq number
  r2.count=r2.count+1
  ! rewind file
```

```
   call send(FDISK,FREWIND,0,r2.file%,0,0,r2.data$)
   call chk.flags("rewind")
   ! update test sequence number
   r2.data$=str$(r2.count)
   r2.data$=r2.data$+string$(6-len(r2.data$)," ")
   call send(FDISK,FWRITE,0,r2.file%,5,0,r2.data$)
   call chk.flags("write")
END SUB
!************************
FUNCTION TSUPEC20 PUBLIC
!************************
!CALL SUBSTR(TS.PRTBUF$,28,"EC20",0,4)
INTEGER*1 TSUPEC20 ! define variable !IR89474
   ! define variables for this module
! misc variables
integer*1 r2.stat
integer*4 r2.hx%,R2.sx%,r2.sum%,r2.s%
string r2.err$,r2.errfx$,r2.z$
on error goto r2.error
if r2.stat=0 then \
   begin
      ! init constants
      ! device addresses
      RCORE=1
      FDISK=2
      EJRNL=3
         PRINTER=4
      RPRO=5
RS232=6
      ! RS232 commands
      RWRITE=0
      RREAD=1
      !RCORE commands
      VERSION=1
      LINK.NUM=2
      ! file commands
      FOPEN=1
      FCREATE=2
      FCLOSE=3
      FDELETE=4
      FWRITE=5
      FREAD=6
      FSEEK=7
      FPOS=8
      FREWIND=9
      FSTAT=10
      FRENAME=11
      FDIR=12
      ! EJ commands
      EJ.STATE=1
      EJ.PRINT=2
      EJ.RESET=3
      EJ.ON=1
      EJ.OFF=0
      ! printer commands
      PRT.PTHRU=1
      PRT.EJECT=2
      PRT.STATUS=3
      PRT.TYPE=4
      PRT.AUTO.EJECT=5
      PRT.LABEL=6
      PRT.IMMED=1
      PRT.BUF=2
      ! open com port
   r2.err$="O" !testcode error location
   open serial 2, 9600, "E", 8, 1 as 48
      open "CR:" as 49
   r2.stat=r2.stat+1 ! set status as file opened
   endif
   if ts.linetype=4 then \
      begin
         call mod4.logo
         call fdisk.test
         call rprint.test
         !call rpro.test
         !call fcc.test
      endif
EXIT FUNCTION
r2.error:
r2.hx%=erm
r2.errfx$=""
for r2.s%=28 to 0 step -4
   r2.sx%=shift(r2.hx%,r2.s%)
   r2.sum%=r2.sx% and 000FH
   if r2.sum%>9 then \
      r2.sum%=r2.sum%+55\
   else
      r2.sum%=r2.sum%+48
      r2.z$=chr$(r2.sum%)
      r2.errfx$=r2.errfx$+r2.z$
next r2.s%
ts.prtbuf$=r2.err$+err+""+r2.errfx$
resume
END FUNCTION
```

What is claimed is:

1. A method of adapting a point-of-sale computer terminal for connection to at least one peripheral device, wherein the point-of-sale computer terminal is capable of communicating signals with external devices in a prescribed manner, the method comprising:

communicatively coupling an adapter to the computer terminal;

communicatively coupling the adapter to the at least one peripheral device;

configuring the computer terminal to transmit data and commands to the adapter in the manner prescribed for communication with external devices;

configuring the adapter to detect computer terminal signals and transform selected patterns of the computer terminal signals into instructions and information having a predetermined format for operating the at least one peripheral device;

interpreting the data and commands transmitted from the computer terminal and transforming the data and commands into instructions and information in a predetermined format for operating the at least one peripheral device;

transmitting signals from the adapter to the computer terminal according to the manner of communication prescribed by the computer terminal; and transmitting the instructions and information to the at least one peripheral device.

2. The method of claim 1, further comprising:

programming the adapter to detect computer terminal signals and transform selected patterns of the computer terminal signals into instructions and information according to features and formats supported by the at least one peripheral device.

3. The method of claim 1, wherein the step of communicatively coupling the adapter to the computer terminal comprises connecting the adapter to an RS-485 bus of the computer terminal.

4. The method of claim 1, wherein the step of communicatively coupling the adapter to the at least one peripheral device comprises connecting the adapter to a PC client for further coupling to the at least one peripheral.

5. The method of claim 4, further comprising:

coupling the PC client to a host computer associated with a network that includes the computer terminal.

6. The method of claim 1, wherein the step of communicatively coupling the adapter to the at least one peripheral device comprises connecting the adapter to at least one printer.

7. The method of claim 1, wherein the step of communicatively coupling the adapter to the at least one peripheral device comprises connecting the adapter to at least one barcode scanner.

8. The method of claim 1, wherein the step of communicatively coupling the adapter to the at least one peripheral device comprises connecting the adapter to at least one display.

9. The method of claim 1, wherein the step of communicatively coupling the adapter to the at least one peripheral device comprises connecting the adapter to at least one keyboard.

10. The method of claim 1, wherein the step of communicatively coupling the adapter to the at least one peripheral device comprises providing a memory in the adapter.

11. The method of claim 1, wherein the step of communicatively coupling the adapter to the at least one peripheral device comprises connecting the adapter to at least one smart card reader.

12. The method of claim 1, wherein the step of communicatively coupling the adapter to the at least one peripheral device comprises connecting the adapter to at least one biometric device.

13. The method of claim 1, wherein the step of communicatively coupling the adapter to the at least one peripheral device comprises connecting the adapter to at least one signature capture device.

14. The method of claim 1, wherein the instructions and information are transmitted to the at least on peripheral device in ASCII format.

15. The method of claim 1, wherein the instructions and information are transmitted to the at least on peripheral device via a RS-232 communications link.

16. The method of claim 1, wherein the step of transmitting signals from the adapter to the computer terminal comprises transmitting signals to the computer terminal according to a format of communication prescribed by a device supported by the computer terminal.

17. The method of claim 16, wherein the step of transmitting signals from the adapter to the computer terminal comprises transmitting signals to the computer terminal according to a MOD4 printer format of communication.

18. The method of claim 1, wherein the step of transmitting signals from the adapter to the computer terminal comprises transmitting signals to the computer terminal as raw data according to a feature C format of communication.

19. The method of claim 1, further comprising:

ascertaining whether an event is ready for processing;

identifying the event upon determining that the event is ready for processing; and based on identification of the event, performing an operation selected from the group consisting of:

detecting a type of the at least one peripheral device;

transmitting a message indicating a status of the at least one peripheral device; and executing a data communication function.

20. The method of claim 19, wherein the operation of executing a data communication function is selected from the group consisting of:

communicating data and commands between the computer terminal and the adapter according to a format of communication prescribed by a device supported by the computer terminal;

communicating data and commands between the computer terminal and the adapter according to a feature C format of communication; and communicating data and commands between the computer terminal and the adapter according to a feature C emulation protocol that defines the data and commands based on keyboard sequences from the computer terminal.

21. The method of claim 19, wherein the operation of executing a data communication function comprises:

reading a character from a receive buffer;

determining whether a communication frame is currently in progress;

if a communication frame is currently in progress, saving the character into a device buffer and determining if the character is a valid end-of-frame character;

if a communication frame is not currently in progress, executing a polling procedure to determine whether to send data in a transmit queue, send an end-of-poll character, or save an address while a poll is in progress.

22. A method of adapting a cash register terminal for connection to at least one peripheral device, wherein the terminal is capable of communicating signals with external devices according to a supported devices format and as data in a non-supported devices format, the method comprising:

communicatively coupling an adapter to the computer terminal;

communicatively coupling the adapter to the at least one peripheral device;

configuring the computer terminal to transmit data and commands to the adapter according to the supported devices format;

configuring the computer terminal to transmit data and commands not supported by the supported devices format as data in the non-supported devices format, the data representing instructions and information having a predetermined format for operating the at least one peripheral device;

configuring the adapter to detect terminal signals and transform selected patterns of the terminal signals into instructions and information having a predetermined format for operating the at least one peripheral device;

interpreting the data and commands transmitted from the terminal according to the supported devices format and transforming the data and commands into instructions and information in a predetermined format for operating the at least one peripheral device;

transmitting signals from the adapter to the terminal according to the supported devices format and non-supported devices format; and transmitting the instructions and information to the at least one peripheral device.

* * * * *